US011005290B2

(12) United States Patent
Stöcker et al.

(10) Patent No.: US 11,005,290 B2
(45) Date of Patent: May 11, 2021

(54) ELECTRIC GRID CONTROL SYSTEM BASED ON PEER-TO-PEER NETWORK

(71) Applicants: Carsten Stöcker, Hilden (DE); Jürgen Waffner, Essen (DE)

(72) Inventors: Carsten Stöcker, Hilden (DE); Jürgen Waffner, Essen (DE)

(73) Assignee: innogy Innovation GmbH, Essen (DE)

( * ) Notice: Subject to any disclaimer, the term of this patent is extended or adjusted under 35 U.S.C. 154(b) by 69 days.

(21) Appl. No.: 16/558,992

(22) Filed: Sep. 3, 2019

(65) Prior Publication Data
US 2019/0393722 A1  Dec. 26, 2019

Related U.S. Application Data

(63) Continuation of application No. PCT/EP2017/055047, filed on Mar. 3, 2017.

(51) Int. Cl.
*H01J 13/00* (2006.01)
*G05B 23/02* (2006.01)
*H02J 13/00* (2006.01)

(52) U.S. Cl.
CPC ...... *H02J 13/0013* (2013.01); *G05B 23/0256* (2013.01)

(58) Field of Classification Search
USPC ........................................................ 700/292
See application file for complete search history.

(56) References Cited

U.S. PATENT DOCUMENTS

| 2011/0004355 A1* | 1/2011 | Wang ..................... H02H 7/261 700/286 |
| 2012/0029720 A1 | 2/2012 | Cherian et al. |
| 2012/0310558 A1* | 12/2012 | Taft ......................... G06Q 30/00 702/61 |
| 2012/0310559 A1* | 12/2012 | Taft ................... H02J 13/00006 702/62 |
| 2012/0324119 A1 | 12/2012 | Imes et al. |
| 2013/0282194 A1 | 10/2013 | Blevins |

(Continued)

FOREIGN PATENT DOCUMENTS

| CN | 201758454 U | 3/2011 |
| CN | 103138290 A | 6/2013 |

(Continued)

*Primary Examiner* — Ryan D. Coyer
(74) *Attorney, Agent, or Firm* — Reinhart Boerner Van Deuren P.C.

(57) ABSTRACT

Embodiments of the disclosure relate to a grid control system for at least one electrical grid. The system includes at least one peer-to-peer network having at least one peer-to-peer application. The peer-to-peer application has a detecting means executable by a part of the nodes of the peer-to-peer network and is configured to detect a first peer-to-peer module assigned to a controllable electrical device upon a connection of the controllable electrical device with the electrical grid. The first peer-to-peer module is configured to communicate with the peer-to-peer application, and the peer-to-peer application includes a registering means executable by at least a part of the nodes of the peer-to-peer network and is configured to store at least one identifier assigned to the detected controllable electrical device and at least one switching pattern of the detected controllable electrical device.

18 Claims, 7 Drawing Sheets

(56) References Cited

U.S. PATENT DOCUMENTS

| | | | |
|---|---|---|---|
| 2015/0097697 A1* | 4/2015 | Laval | H04L 69/03 |
| | | | 340/870.02 |
| 2015/0178700 A1 | 6/2015 | Forbes, Jr. | |
| 2017/0160711 A1* | 6/2017 | Wong | G05B 19/042 |
| 2017/0229868 A1* | 8/2017 | Laval | H02J 13/00028 |

FOREIGN PATENT DOCUMENTS

| | | |
|---|---|---|
| CN | 103560535 A * | 2/2014 |
| CN | 204481571 U | 7/2015 |
| EP | 2 166 729 B1 | 7/2014 |
| FR | 2 915 044 A1 | 10/2008 |
| JP | 2005-252606 A | 9/2005 |
| WO | WO 2012/038445 A1 | 3/2012 |

* cited by examiner

ELECTRIC GRID CONTROL SYSTEM BASED ON PEER-TO-PEER NETWORK

CROSS-REFERENCE TO RELATED PATENT APPLICATIONS

This patent application is a continuation of PCT/EP2017/055047, filed Mar. 3, 2017, the entire teachings and disclosure of which are incorporated herein by reference thereto.

FIELD

The application relates to a grid controlling system for controlling at least one electrical grid (e.g. an AC and/or DC grid). The application relates also to a method for controlling at least one electrical grid, a peer-to-peer application for controlling at least one electrical grid, a first peer-to-peer module and a testing device.

BACKGROUND

Electrical grids are operated and controlled by a grid operator by means of a central control entity in form of a server. A main task of the central control entity is to keep at least one electrical grid parameter, in particular, the grid voltage and/or the grid frequency, (sufficiently) steady. In order to steadily operate a grid a grid load plan can be established. For instance, for the grid load planning of a power supply network and electrical grid, respectively, it is necessary for a power supplier to indicate a load profile to the grid operator. In addition, the power supplier has to ensure that the electrical energy he supplies to the customers is actually fed into the electrical grid. To this end, the power supplier (full supplier) shall conclude long-term contracts with individual power plants or the like. For generation planning, it is necessary that the load profile of a power supplier is essentially known so that the load flow in the power supply network is substantially balanced.

When creating the load profile, the power supplier and power provider, respectively, may consider the historical load flows of his customers/electrical loads to be supplied as a whole and determines a possible load profile for the future. Depending on this planned load profile, the power supplier buys electrical energy in order to deliver said power to the respective loads.

In the case of power fluctuations within the electrical grid network due to e.g. unforeseen events, it may be necessary to regulate the electrical power fed into the electrical grid and/or the electrical power drawn from the electrical grid. For this purpose, the so-called (positive or negative) control power can be used. This (positive or negative) control power or energy can be regarded as a reserve to compensate for load and demand fluctuations. In this case, it may be necessary to compensate for load or demand peaks by regulating power.

A typical prior art grid control system 100 is shown in FIG. 1. The system 100 comprises an electrical grid 102, a plurality of producing devices 106 and a plurality of non-controllable electrical loads 108. In addition, controllable electrical devices 110 in form of controllable loads and/or controllable producers are connected to the electrical power lines of the grid 102. A central control instance 104, e.g. in form of a server 104, is configured to monitor the status of the grid 102 e.g. by measuring at least one electrical parameter (e.g. the grid frequency and/or grid voltage). For instance, due to an unforeseen event a power fluctuation is detected e.g. by detecting a grid frequency value outside a permissioned range. In such a case, the central control instance may send an instruction data set to one or more of the controllable electrical entities 110 (clients) acting as reserve to compensate for load and demand fluctuations. Based on a received instruction data set, the respective load 110 and/or producer 112 may be switched (e.g. activated or deactivated) in order to reduce the detected power fluctuation.

A steady issue of the described prior art systems is the need of a manual registering and/or testing process of possible controllable electrical devices capable of providing (positive and/or negative) control energy. These processes are cumbersome and may be manipulated by third parties.

In particular, a drawback of such a grid control system is the server-client structure of these systems. Usually, a central server is used for conducting e.g. a registering process. A further disadvantage of server-client structures of this kind, particularly the server (or platform), apart from the high transaction costs, is that the central instance or central server manages confidential data including e.g. user data, authorization data, provider data, control data or the like. A persistent problem affecting the central instance is that of protecting the confidential data stored on one or more server(s) from access by unauthorized third parties. In particular, a high degree of security expenditure is required, in order to prevent said data from being tampered with. This in turn leads to even higher transaction costs. A further disadvantage is the complex and costly infrastructure for providing the described server-client structure.

Therefore, it is an object of the present invention to provide a grid control system, which enables to operate such a system more efficient and, at the same time, with a higher security level.

BRIEF SUMMARY

The object is solved according to a first aspect of the present invention by a grid control system. The grid control system is, in particular, configured for controlling and managing at least one electrical grid. The grid control system comprises at least one peer-to-peer network comprising at least one peer-to-peer application. The peer-to-peer application comprises at least one detecting means executable by at least a part of the nodes of the peer-to-peer network and configured to detect at least one first peer-to-peer module assigned to at least one controllable electrical device upon a connection of the controllable electrical device with the electrical grid. The first peer-to-peer module is configured to communicate with the peer-to-peer application, in particular, over at least one communication network. The peer-to-peer application comprises at least one registering means executable by at least a part of the nodes of the peer-to-peer network and configured to store at least one identifier assigned to the detected controllable electrical device and at least one switching pattern of the detected controllable electrical device.

In contrast to prior art grid control systems, detecting and registering processes of controllable electrical devices, which are capable of providing (positive and/or negative) control power, is conducted in a more efficient and more secure way by at least executing a detecting means and registering means by at least a part (e.g. >1) of the nodes of a peer-to-peer network. In other words, an electrical grid can be managed and controlled in order to keep grid voltage and grid frequency (sufficiently) steady without a central instance but by a peer-to-peer application of a peer-to-peer network. By the fact that instead of a central server or a platform, a peer-to-peer network (also called a framework) undertakes the, in particular, tamper-proof detecting and registering of new controllable electrical devices, by means of a peer-to-peer application, high security standards are achieved in that all computers (peer nodes or simply nodes) in the peer-to-peer network, at least a part of the nodes in the peer-to-peer network, at least monitor(s) preferably each process, in particular, by executing e.g. the detecting means and registering means. Thereby, the transaction costs can be significantly reduced. No central, superior platform, server, cloud, etc. is required. The complexity of managing and controlling an electrical grid can be significantly reduced. Control data of a controllable electrical device and/or other confidential data can be securely managed.

The electrical grid may be a conventional electrical grid, such as a high-voltage grid, medium-voltage grid and/or low-voltage grid. A plurality of electrical devices can be connected with the one or more power lines of the at least one electrical grid. Electrical devices include non-controllable electrical devices and controllable electrical devices. An electrical device may be a producer (e.g. photovoltaic device, wind turbine, a gas-driven power station, etc.), a consumer (e.g. furnace, cold store, etc.) and load, respectively, and/or an electrical storage, such as a battery or the like. According to the present application, a controllable electrical device is an electrical device which is capable to provide negative and/or positive control power (energy) (at least temporarily). A controllable electrical device can be controlled by means of the present peer-to-peer network and application, respectively. In particular, the power delivered by a controllable electrical device and/or the power consumed by a controllable electrical device can be controlled.

The grid control system comprises at least one peer-to-peer network with at least one peer-to-peer application. A peer-to-peer network according to the present application is characterized in that it comprises a plurality of nodes, wherein at least a part (>1) of the nodes comprises the same peer-to-peer application.

In comparison to a client server system in which a server provides a service (e.g. registering process) and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the (same) peer-to-peer application. This means that a plurality of nodes comprises the same executable means and executes such a means e.g. upon receipt of a trigger.

The present peer-to-peer application comprises at least one detecting means, preferably in form of a smart (or private) contract, configured to detect at least one first peer-to-peer module assigned to the at least one controllable electrical device upon the establishment of a (electrical) connection of the controllable electrical device with the electrical grid. In particular, upon an initial connection or a reconnection after e.g. an operation stop of the controllable electrical device, the detecting means may detect said new connection and new device, respectively. In other words, the detecting means is configured to detect a new controllable electrical device in the electrical grid to be controlled.

In particular, detecting a new controllable electrical device comprises detecting a new first peer-to-peer module assigned to said controllable electrical device. At least one first peer-to-peer module is assigned to the controllable electrical device. For instance, each controllable electrical device may comprise a separate peer-to-peer module. Preferably, each peer-to-peer module is uniquely assigned to a respective controllable electrical device. For instance, a controllable electrical device can comprise a peer-to-peer module. Preferably, the first peer-to peer module can be integrated in the controllable electrical device.

It is also possible that a communication connection is provided between the controllable electrical device and a (remotely arranged) first peer-to-peer module assigned to said controllable electrical device. This means that the first peer-to-peer module can at least communicate and/or act on behalf of the controllable electrical device. For example, the first peer-to-peer module can be partly formed by a separate processing device, such as mobile communication device (e.g. mobile phone, mobile computer, embedded computer/controller, etc.), or it can run on a remote stationary processing device (e.g. in a data center). In case of a mobile communication device or a remote processing device the at least one controllable electrical device may have a (secure) communication channel to the processing device (or mobile communication device) of the data center and the processing device itself may have a connection to the peer-to-peer network. In an embodiment the remote processing device may be a gateway to the peer-to-peer network. This means that the controllable electrical device can securely communicate via its peer-to-peer module and the gateway to the peer-to-peer network. A peer-to-peer module might have a crypto chip or secure element to generate and store a public private key pair.

Generally, a peer-to-peer module according to the present application is configured to communicate, e.g. send/receive messages to/from the peer-to-peer application. The peer-to-peer module may be a peer and node, respectively, of the peer-to-peer network. The first peer-to-peer module may be configured to provide at least an identifier assigned to the controllable electrical device and e.g. at least one (preset) switching pattern of the controllable electrical device.

A switching pattern according to the present application represents the time profile of the electrical power (e.g. described by metrics such as voltage, current, frequency, phase angle, etc.) of the controllable electrical device during a switching process and/or the time profile of the electrical power after the application of an input signal in order to measure the response of an electrical system (e.g. impulse response). The switching pattern can be dependent on further (external) parameters of the controllable electrical device (e.g. status of the device, usage of the device, physical parameters, such as temperature, pressure, etc.). A switching pattern can be created and/or measured by a systematic variation of the parameters or within a measurement period where the parameters can be varied in a typical way (e.g. parameter monitoring and switching pattern measurement during a statistically relevant operations period of the device).

It shall be understood that a switching pattern can be created and/or measured following a formal qualification process (e.g. measurement within a time period and following measurement requirements that are defined by an authority). The result of the formal qualification process can be stored in the peer-to-peer application, as described hereinafter.

A response pattern measured during a switching process or after the application of an input signal can show statistical variations. These statistical variations, dependent on input parameters and device or external parameters, can be recorded to form the switching pattern. Further output parameters of analytical calculations of the response pattern can be stored in a switching pattern (e.g. frequency response functions, non-linear system behavior data). These data can be used in a later step by computer analytics or algorithms to predict statistical probabilities for response patterns or the device response to specific switching control parameters (including a correlation with other internal and/or external parameters). These (predicted) response patterns can be added for a set of switching scenarios or schemes to form a switching pattern of controllable electrical device. Schemes can be created by central or decentral analytics, AI or ML systems.

The switching pattern and profile, respectively, can also be referred to as a performance profile. The switching pattern may be recorded as a function of a switching scheme of the controllable electrical device. A switching pattern can be used by the peer-to-peer application to select a suitable switching scheme in which the switching pattern is used to adjust the switching performance to a requirement of (negative or positive) control energy for controlling the electrical grid. Thereby, a switching scheme is, in particular, designed for the power requirement of the controllable electrical device. In a switching scheme, a flexibility of the switching time can be stored. For instance, in a switching scheme, at least one switching window, that is to say a certain period, can be specified, within which the load/producer must be switched for a period shorter than the period. In particular, according to the present application, the time profile of the consumed/produced power of the switched electrical devices can be adapted to a time curve of the required (negative or positive) control energy. It is noted that registering can include storing at least one switching scheme of the controllable electrical device.

Further, switching patterns for a group of controllable electrical device can be aggregated by an aggregating means of the peer-to-peer application into a virtual controllable electrical device. An aggregation process can include a switching pattern analysis and/or measurement process to form a switching pattern for the virtual controllable electrical device. Dependencies among the controllable electrical devices and their switching patterns can be monitored, analyzed and stored in the virtual switching pattern for the virtual controllable electrical device. In addition, analytically and statistically methods can be applied to improve the statistically variations or predictions of a virtual controllable electrical device. As a result of an improved statistical behavior of virtual controllable electrical device fewer devices could be needed to guarantee a certain switching pattern within statistical probability ranges (compared to the simple sum of individual devices).

In a further embodiment of the virtual controllable electrical device, dynamic adjustments, selections and/or scenarios of the underlying individual controllable electrical devices can be modelled and/or stored in a virtual switching pattern.

A virtual controllable electrical device can be stored by the registration means.

The formal qualification of one (virtual) controllable electrical device can be (automatically) triggered by a detecting and/or testing and/or registering means upon registration in the peer-to-peer application. It can be stored in the peer-to-peer application.

Further, the peer-to-peer application comprises at least one registering means, preferably, in form of a smart contract. The registering means may be executable by a part, e.g. a plurality, of nodes of the peer-to-peer network. In particular, a provision of an identifier and e.g. a switching pattern (data set) can initiate the execution of said means.

For instance, upon receipt of a message comprising the identifier from the first peer-to-peer module, a registering process may be initiated. The registering process may also be initiated upon a detection of a first peer-to-peer module e.g. by the detecting module. In this case, the registering means may transmit a request message for requesting at least the identifier assigned to the controllable electrical device to the first peer-to-peer module. As a response, the registering means may receive a response message comprising at least the identifier. Further, at least one switching pattern of the controllable electrical device can be included in the response message. It may be also possible that the at least one switching pattern is determined upon a testing operation and/or received from a database or the like.

In a further embodiment, testing operations can be done on a regular base in order to reflect and measure changes in the behavior of controllable electrical device (e.g. as a result of aging or changes in internal and external or usage parameters). Parameters for execution of regular testing operations might be stored in the registration means.

The identifier assigned to the controllable electrical device may be a unique code (e.g. a communication address, device ID, public key, etc.). The identifier may (also) be the identifier of the first peer-to-peer module (or vice versa).

Preferably, prior to processing a message an authentication process can be conducted by e.g. an authentication means of the peer-to-peer application executable by at least a part of the nodes of the peer-to-peer application. The authentication process can comprise checking the sender of a message e.g. by checking a signature of the sender, and address of the sender, and/or the like.

A controllable electrical device may include a financial modeling means and/or a pricing engine. Static prices or pricing tables for proving a control capacity within a certain range and time or for sending control signals to controllable electrical device might be stored in the registration means. The controllable electrical device might be able to update the static prices or pricing tables in the registration means.

In a further embodiment, methods and interfaces for dynamic pricing provided by controllable electrical device might be stored in the registration means.

A grid control transaction criterion might comprise such a price.

Further, the peer-to-peer application might form one or more flexibility market(s). Controllable electrical device and/or detecting means might be registered to participate in one or more flexibility markets. Flexibility markets can be dynamically formed by e.g. smart contracts in the peer-to-peer application.

In a further embodiment, a virtual controllable electrical device might include an optimization means that calculates the best usage of individual controllable electrical devices for a required switching pattern response. This calculation might be based on the prices of the individual controllable electrical devices.

Further, the decision about usage of switching pattern(s) can be the result of a peer-to-peer (real-time) negotiation among one or more optimization means and one or more controllable electrical device(s). The communication among optimization mean(s) and controllable electrical device(s) in the negotiation process may be stored in the peer-to-peer application.

The registering means is configured to register one or more controllable electrical device(s). Registering is conducted by storing at least the provided identifier and at least one switching pattern of the respective controllable electrical device in, preferably, a registry storage. In particular, each available controllable electrical device(s) of the electrical grid to be controlled can be registered by storing at least the respective identifier and associated data, such as a switching pattern and/or pricing methods or interfaces.

The registry storage may be updatable and, in particular, inspectable by at least a part of the participating entities/units of the system. Updatable means, in particular, that data associated with an identifier of a respective controllable electrical device can be changed, deleted or added. Authorization methods for updates might be stored in the registry. Inspectable means, in particular, that other parties can read out data from the registry storage. Thereby, according to one embodiment, access to the data (preferably stored in encrypted form) can be controlled by the peer-to-peer application, in particular, by an access controlling means of the peer-to-peer application.

The registry storage may be at least controlled by the peer-to-peer application. For instance, the registry storage can be part of the peer-to-peer application. Alternatively or additionally, an (off-chain) storage arrangement comprising the at least one registry storage can be provided. The (off-chain) storage arrangement may be controlled by the peer-to-peer application. In particular, the access to data stored in the storage arrangement can be controlled by the peer-to-peer application. Preferably, the storage arrangement comprising a plurality of decentral storage units may be formed as a decentral file system (such as IPFS) or a decentral object store (such as storj) or a decentral distributed database (such as BigchainDB) controlled by the peer-to-peer application.

It is noted that the actual availability and/or switching pattern of each registered controllable electrical device can be checked e.g. at preset time intervals, continuously or the like. If a disconnection is determined, the registry can be updated accordingly.

Preferably, the detecting means may be configured to detect the first peer-to-peer module by reading at least one connection indication set by the first peer-to-peer module upon the connection of the controllable electrical device with the electrical grid. Based on the set connection indication (e.g. a particular flag or the like), the detecting means e.g. comprising a crawling function can detect a newly connected controllable electrical device. Alternatively or additionally, detecting can comprise detecting the identifier of all available first peer-to-peer modules and controllable electrical devices, respectively, and comparing the detected identifiers with the identifiers of already registered first peer-to-peer modules and controllable electrical devices, respectively. Then, the not-registered identifiers can be regarded as newly connected first peer-to-peer modules and controllable electrical devices, respectively, to be registered. Alternatively or additionally, detecting may include the receipt of a registering message from a first peer-to-peer module assigned to a newly connected controllable electrical device.

Further, detecting may include at least reading out at least one identifier assigned to the detected controllable electrical device and/or at least one preset switching pattern of the controllable electrical device.

It shall be understood that the Original Equipment Manufacturer (OEM) of a controllable electrical device might provide predefined switching patterns, test operations setups, control schemes or response patterns measured during quality testing in the manufacturing process that may be stored in the device (or in a digital product memory) and e.g. written into the peer-to-peer application during the registration process, According to a first embodiment of a system according to the present application, the peer-to-peer application may comprise at least one testing means executable by at least a part of the nodes of the peer-to-peer network and configured to initiate at least one test operation for determining the actual switching behavior of at least one controllable electrical device. Alternatively or additionally, the peer-to-peer application may comprise at least one testing means executable by at least a part of the nodes of the peer-to-peer network and configured to receive at least one test result of at least one conducted test operation for determining the actual switching behavior of at least one controllable electrical device. The provision of a testing means (an independently inventive aspect) enables an automatic determination of the actual switching behavior of a controllable electrical device which might e.g. differ from a preset switching pattern. In particular, in order to compensate a grid fluctuation successfully it must be ensured that a desired switching behavior (including a desired (positive or negative) control power amount) is provided by the respective controllable electrical device as expected. Otherwise, a fluctuation might be not sufficiently reduced in order to keep the grid steady. The determination of the actual switching behavior of a controllable electrical device ensures that grid fluctuations can be reliably compensated.

It shall be understood that self-regulating devices can be registered in the peer-to-peer application. Switching and/or response patterns of self-regulating devices may be stored in the peer-to-peer application (e.g. digital grid routers, digital grid controllers).

According to a preferred embodiment of the present application, the testing means may be configured to initiate at least one test operation by transmitting at least one test request message comprising at least one test parameter data set to the second peer-to-peer module. The test parameter data set may comprise at least one of the following data:
    at least one instruction to conduct the test operation,
    at least one identifier of the controllable electrical device to be tested, and
    at least one test operation setup.

The test request message may be transmitted to the controllable electrical device (e.g. to its first peer-to-peer module) to be tested and/or to a testing device configured to (remotely) test the controllable electrical device to be tested. The test request message may directly cause the conduction of test operation at the controllable electrical device or indirectly via a testing device. Besides the identifier of the controllable electrical device to be tested and an instruction to conduct the test operation, at least one test operation setup may be preferably transmitted. A test operation setup may comprise details about the test operation to be performed, such as switching instruction(s), test signal(s) to be used, signals to be monitored in order to obtain a test result, etc. In case of a testing device, different test setups may be stored at the testing device. In such a case, the transmitted test operation setup may be only an identifier of a stored test setup.

Furthermore, the peer-to-peer application, according to a further embodiment, may comprise at least one storing means (for instance, the above described registering means) executable by at least a part of the nodes of the peer-to-peer network and configured to store the received test result. Storing the received test result may comprise at least storing at least one actual switching pattern of the tested controllable electrical device. The actual switching pattern might be included in the received test result or the switching pattern can be derived from the received test parameter values of the test result. Alternatively, storing the received test result may comprise adapting an already stored switching pattern in accordance with the received test result. Further, the storing (registering) means may be configured to assign at least one reputation factor to the controllable electrical device based on the test result of the conducted test operation.

The at least one test operation might be conducted prior to or during the registering process. For instance, only if the test result (e.g. a switching pattern) meets one or more predefined (performance) criterion/a, a new controllable electrical device is actually registered. It shall be understood that the testing process can also be performed upon a registration.

According to a preferred embodiment of the system according to the present application, the system may comprise at least one testing device configured to conduct at least one test operation (e.g. upon receipt of a previously described test request message) by transmitting at least one test request signal to the controllable electrical device (to be tested) and/or by receiving at least one test response signal (e.g. comprising a test result and/or measurable test response signals) from the (tested) controllable electrical device. The system may comprise at least one second peer-to-peer module assigned to the testing device. The second peer-to-peer module may be formed according to the first peer-to-peer module. The second peer-to-peer module may be configured to transmit at least the test result of the conducted test operation to the peer-to-peer application. In particular, the testing means may be configured to communicate with the second peer-to-peer module. For instance, in order to initiate at least one specific test operation of at least one specific controllable electrical device, a respective (previously described) test request message may be transmitted to the test device. The test device may comprise technical means configured to conduct the test operation as specified in said test request message. For instance, one or more test request signal(s) causing a switching action at the controllable electrical device to be tested can be transmitted. In particular, the one or more test request signal(s) may be test control signals for causing ramping-up, holding and/or shutting down of the controllable electrical device. Upon obtaining the test result(s), the respective test results are provided to the testing means of the peer-to-peer application. This structure enables conducting of test operations under the control of the peer-to-peer network and application, respectively. In particular, two or more nodes can monitor the testing process and may check the test result including a test protocol. The security and reliability can be increased.

Generally, the testing device can be arranged at an arbitrary position as long as the testing device is capable of conducting or at least initiating the test operation at the controllable electrical device to be tested. In particular, at least one electrical power and/or communications connection can be provided between the testing device and the one or more controllable electrical device(s) to be tested. According to a particular preferred embodiment, the system may comprise at least one transformer station, wherein the transformer station comprises the testing device. In particular, the testing device comprising the second peer-to-peer module may be integrated in the transformer station. A transformer station is a particular preferred position of a testing device due to the already provided electrical power and/or communications connection(s) between the transformer station and the one or more controllable electrical device(s) to be tested.

Furthermore, it has been found that the actual switching behavior of a controllable electrical device may depend on the actual (common) switching behavior of two or more further controllable device. Therefore, according to a further embodiment, the present application proposes a testing means which may be configured to initiate at least one common test operation for testing at least two controllable electrical devices simultaneously. In other words, a "sum" test of a plurality of controllable electrical devices can be initiated by the testing means and e.g. executed by the above described testing device. Two or more test operations (including two or more switching actions) of two or more controllable electrical devices can be conducted at least partly simultaneously. The two or more test results can be provided to the peer-to-peer application, e.g. as described hereinbefore. In particular, based on the test results, the at least one switching pattern of each respective controllable electrical device can be stored and/or adapted, e.g. as described hereinbefore It has been further found that the actual switching behavior of a controllable electrical device may change over the operating time of said controllable electrical device. In order to take account of such a change, according to a further embodiment, the testing means may be configured to initiate at least one further test operation of an already tested controllable electrical device upon expiry of at least one preset time period (e.g. after the former test time point). The preset time period can be generally set and/or individually for each of the controllable electrical device. Due to the provision of the peer-to-peer network, an automatic test operation can be conducted with low expenses. For instance, each registered controllable electrical device can be tested each year, each three years, etc. The test operation may be an individual test operation or a common test operation, as e.g. described above.

According to a further preferred embodiment of the present application, the system may comprise at least one creating means at least controllable by the peer-to-peer application, preferably, directly executable by at least a part of the nodes of the peer-to-peer network. The creating means may be configured to create at least one control scheme based on a grid condition and on at least a part of the stored switching patterns of the registered controllable electrical devices, in particular, for controlling at least a part of the registered controllable electrical devices. The peer-to-peer application may comprise at least one grid controlling means executable by at least a part of the nodes of the peer-to-peer network (or by an embedded controller of an controllable electrical device) and configured to control at least one of the registered controllable electrical devices based on the control scheme. This aspect is independently inventive. For instance, based on the current actual grid status (e.g. a measured grid frequency and/or measured grid voltage) a control scheme can be created such that a grid fluctuation can be compensated. In particular, a control scheme can be formed by one or more switching pattern and e.g. based on one or switching schemes such that the switching performance is adjusted to a requirement of (negative or positive) control energy for controlling the electrical grid. It is also possible that one or more control scheme is/are created based on estimated grid status(es). Such control scheme(s) can be e.g. stored and used upon detection of said grid status. The control scheme might be a local control scheme for only a part of the electrical grid, such as a sub grid e.g. in form of a specific low voltage grid. In such a case, also the position of the one or more controllable electrical device(s) to be used can be taken into account by the creating means and/or controlling means.

It shall be understood that (local) control schemes can be created by statistical and/or self-learning algorithm(s). A virtual controllable electrical device can store local control scheme(s) in the underlying individual controllable electrical device in order to improve response times, switching pattern parameters and/or reliability of the virtual controllable electrical device.

The creating and controlling process can include transmitting of instructions to the one or more controllable electrical device(s) based on the grid status and the control scheme e.g. in order to cause (directly) switching on (or off) of the respective one or more controllable electrical device(s). In other words, the controlling means may transmit the respective instruction in (almost) real-time based on the current grid status and a current control scheme.

According to a preferred embodiment, the one or more controllable electrical device(s) may be configured by the controlling means such that the one or more controllable electrical device(s) can be autonomously operated. In particular, the grid controlling means may be configured to control the controllable electrical device by transmitting at least one instruction code data set to at least one registered controllable electrical device. The instruction data set may comprise at least one switching rule implementable on a controllable electrical device such that the controllable electrical device (autonomously) works in accordance with the implemented switching rule. In particular, based on the individual test results and/or common test results and on possible grid status(es) (e.g. different phases "green", "yellow", "red", as will described hereinafter), one or more implementable instruction data set(s) may be created and transmitted to the respective controllable electrical device(s). The at least one switching rule can be locally implemented and installed, respectively, at the respective controllable electrical device. The switching rule may be installed such that the respective controllable electrical device is operated in accordance with the one or more installed switching rule(s). For instance, the controllable electrical device may comprise a measuring means for (locally) measuring the current grid frequency and/or the current grid voltage. Based on the (currently) measured parameter(s) and based on the implemented switching rule, the controllable electrical device may be switched, e.g. on or off.

Preferably, the first peer-to-peer module may monitor each switching action and may transmit the monitored information (e.g. a switching protocol) to the peer-to-peer application. The switching protocol may be stored such that it can be inspected. Further, the at least one switching rule may be updatable in order to take e.g. an analysis result and/or newly registered controllable electrical device(s) into account and to optimize the control of the controllable electrical grid.

It shall be understood that a controllable electrical device can be also controlled such that a power draw/delivery is increased (or reduced).

Furthermore, according to an embodiment of the present application, the system may comprise at least one analyzing means at least controllable by the peer-to-peer application and configured to analyze a plurality of controllable electrical devices based on at least one of the following: individual switching pattern(s), individual test result(s), common test result(s), historical switching action(s), (individual) reputation factor. The creating means may be configured to create, e.g. adapt, at least one control scheme based on the result of the analysis. The one or more analyzing means may be preferably implemented on an off-chain computing device controlled by the peer-to-peer application. Alternatively or additionally, at least one analyzing means may be executed by at least a part of the nodes of the peer-to-peer network. An analyzing means may comprise one or more analyzing tools (e.g. Artificial Intelligence algorithm(s), Machine Learning algorithm(s), Neuronal Networks) configured to analyze data. Preferably, every switching action and grid control action, respectively, can be monitored and stored (e.g. logged) by the peer to-peer application. Such historical switching action(s) may comprise switching protocols, monitored actual switching behavior of one or more controllable electrical device(s), etc. Based on this data, control schemes can be optimized. For instance, one or more switching rule(s) can be adapted and, preferably, transmitted to the respective controllable electrical device(s) such that the adapted switching module can be installed at the respective controllable electrical device(s). Then, the respective controllable electrical device(s) can be operated in accordance with the at least one adapted switching rule.

It is noted that controlling the controllable electrical devices may be conducted in accordance with the so called "traffic light concept". According to this concept, there are three phases green (no critical grid conditions), yellow (possible critical grid conditions) and red (direct critical grid conditions). There may be different control schemes applicable for different phases.

According to a further embodiment, the peer-to-peer application may be configured to generate at least one grid control transaction agreement about the controlling (and e.g. a switching action) of at least one registered controllable electrical device. The grid control transaction agreement may comprise at least one of the following:
  grid control transaction criterion,
  identifier of the at least one controllable electrical device,
  switching pattern.

The peer-to-peer application may be configured to store a generated grid control transaction agreement. A grid control transaction agreement may be a smart contract. In particular, the grid controlling means may be at least a part of the grid control transaction agreement. A grid control transaction agreement may comprise at least one identifier of the controllable electrical device to be controlled. In addition, one or more cryptographic key(s) needed to communicate with the respective controllable electrical device may be stored in the grid control transaction agreement.

Further, a grid control transaction criterion may be stored in the grid control transaction agreement. It may be possible that for a use of a controllable electrical device as a power reserve, e.g. for each switching action and/or for a predefined time period, the grid controller (e.g. a further entity and/or provider of the peer-to-peer application and network, respectively) has to fulfill one or more grid control transaction criterion/criteria in order to be allowed to use the controllable electrical device if needed. For instance, the grid control transaction criterion may be a financial value. Financial values can be (instantaneously) exchanged with a transaction via a cryptocurrency. Escrow functionality can be used to mitigate credit risk of transactions. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network, Lightning Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. In an embodiment advanced cryptographic methods may be used to enable anonymous transactions (e.g. zk Proof Systems, Ring Signatures, Mixers, HD Wallets). According to the present application, a man-in-the-middle is not necessary.

The grid control transaction agreement may be a grid control transaction agreement between one or more entity(ies) (e.g. the controllable electrical device(s) or its user) and the peer-to-peer application (and/or one or more further entity(ies)). The generation of the grid control transaction agreement can be caused or initiated by at least one peer-to-peer module, such as a first peer-to-peer module of a controllable electrical device, for example, by transmitting a request message comprising at least one instruction on the generation of the grid control transaction agreement. A preferred option is that the generation of a grid control transaction agreement is caused, in particular, upon a successful registration of a respective controllable electrical device.

In particular, a suitable code and, where necessary, at least one key (e.g. signature) for verifying the sender of a message (e.g. sending peer-to-peer module and/or assigned entity) and/or the authenticity of a message can be transmitted to the peer-to-peer application or written in the peer-to-peer application by the peer-to-peer module. Preferably, following a confirmation message from the (provider) controllable electrical device and/or the peer-to-peer application comprising a suitable instruction and, where necessary, at least one key (e.g. signature) for verifying the sender of the confirmation message, a corresponding grid control transaction agreement can be advantageously generated following a check by the peer-to-peer network of the peer-to-peer application. Expressed in simple terms, each entity can search for one or a plurality of suitable partners by means of the peer-to-peer network or the peer-to-peer application and a grid control transaction agreement can be generated by means of the peer-to-peer application.

In addition, a grid control transaction agreement may comprise information about one or more test operation(s). For instance, it can be stored what kind of test operation will be performed and/or at which time points.

Based on the generated grid control transaction agreement, the grid controlling means may control the switching of a controllable electrical device.

Further, as described hereinbefore, the registering means of the peer-to-peer application may be configured to receive e.g. a registering message of a peer-to-peer module assigned to an entity. The registering means may be configured to register the entity (e.g. a controllable electrical device, a testing device, etc.) by storing at least a unique (peer-to-peer) identifier. The identifier can be stored in the previously described registry storage and/or an identifier list. Preferably, the identifier list can be stored in the peer-to-peer application and/or a storage arrangement controlled by the peer-to-peer application. The registry storage and/or identifier list can be used by the peer-to-peer application for verifying e.g. a sender of a message. Preferably, each message transmitted between participants of the peer-to-peer network can comprise an identifier which can be checked by at least part of the nodes of the peer-to-peer network based on the identifier list comprising the identifiers of all registered entities. Thereby, the security of any process conducted and/or controlled by the peer-to-peer application can be further increased.

More particularly, an entity including a user, device, unit, apparatus, or the like can be registered in the peer-to-peer application, as e.g. a so called smart asset. Each registered entity can be stored with its unique (peer-to-peer) identifier e.g. in one or more identifier list(s) of authorized entities. An identifier of an entity might be already a peer-to-peer identifier or another identifier suitable to uniquely identify the entity. The unique peer-to-peer identifier may be a serial number or a smart asset hash of e.g. the entity, the user's name of the entity, a communication address of an entity, a signature, etc. If e.g. an identifier of an entity is not already a unique peer-to-peer identifier, e.g. if the identifier is non-unique name of a user, the peer-to-peer application, in particular, the registering means, may be configured to generate an unique peer-to-peer identifier for the respective entity (according to preset rule(s)).

It shall be understood that an entity may be an (autonomous) device.

It shall be understood that an entity can be a user registered in the peer-to-peer application. Each registered user can be stored with or linked to its unique (peer-to-peer identifier) e.g. in one or more identifier list(s) of authorized entities. According to an embodiment of the method according to the present invention, a user may authenticate himself at one of the devices, such as a controllable electrical device.

Prior to the registering of an entity (e.g. testing device, controllable electrical device), at least part of the nodes (peers) of the peer-to-peer network may check, in particular, by executing the registering means, whether one or more registering requirement(s) (such as specific entity specification(s), valid signature(s) and/or compliance requirement(s)) predefined by the peer-to-peer network are met by the entity to be registered. For instance, it may be necessary that a controllable electrical device or a testing device meets predefined technical specifications. In order to perform the check, preferably, further data may be exchanged between the respective peer-to-peer module and the peer-to-peer application. In particular, the peers of the peer-to-peer network may provide registering rules or registering requirements which must be fulfilled by an entity to be regarded as a trustful entity. Rules/requirements may be individually defined by the peers of a peer-to-peer network. E.g. it may be necessary that a new entity must be recommended by an entity which is already a participant of the peer-to-peer network or a consensus algorithm is defined that rules of which and how many peers need to confirm registration of a new device. In addition, it may be necessary that this participant must have a reputation factor which increases a predefined minimum reputation factor. For instance, if a device has a low reputation factor e.g. due to deviation between set values and actual values, the device may not be registered by the registering means. It shall be understood that a pre-defined reputation factor can be calculated, e.g. based on a reputation factor for a device type of a device supplier, or reputation factor calculated from data of the digital product memory of a device.

According to a further preferred embodiment, the at least one peer-to-peer application can be a decentralized register or a shared database configured to store data, e.g. grid control transaction agreement(s), identifier(s), control instruction data set(s), switching pattern, test results, test protocols, switching protocols, etc., with given certain proofs or signatures. In addition to e.g. identifiers, the decentral register can store computer code acting as e.g. grid controlling means, registering means, detecting means or testing means. In particular, the code can be invoked by a transaction to the address of the code in so called 'smart contracts'. This code can be processed on the plurality of node(s) of the peer-to-peer network.

As described hereinbefore, the analyzing means may include algorithm(s) for de-central cognitive analytics, artificial intelligence, neural networks, or machine learning. Analytics and learning can be shared with other devices, aggregated and further analyzed via the peer-to-peer application.

A decentralized register can be readable at least by a part of the participants of the peer-to-peer network. In particular, every computer node and each registered entity (by means of the respective peer-to-peer module) can comprise the peer-to-peer application. The decentralized register, at least its public part (i.e. may be without private contracts), may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application.

A message or transaction sent to a smart contract may start the execution of a code of the smart contract (e.g. registering means, grid controlling means, detecting means, testing means, analyzing means, etc.) while using data stored in the smart contract. For instance, based on a received current grid status the grid controlling means may start the execution of the code resulting in e.g. initiating of switching of at least one controllable electrical device, as described hereinbefore.

The peer-to-peer application can be built upon the following elements: peer-to-peer network comprising Consensus System and/or Protocol, Data Structure, Merkle Trees, Public Key Signatures, Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer (node) in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation of a means can thus be prevented, at least detected.

Moreover, at least a plurality of nodes, preferably each node can in each case comprise the complete data content, but include at least a portion of the data contents of the peer-to-peer application, in particular of the decentral register. For example, it may be provided that after a positive verification of written information or e.g. a positive registering in the peer-to-peer application this information is saved by all nodes, at least by a part of the computers. For instance, after the generation of a grid control transaction agreement and/or after a successful registering, the agreement and (new) identifier, respectively, can be stored at least by a part, preferably all nodes of the peer-to-peer network. The tamper resistance of the data stored in the peer-to-peer application can thereby be further improved. Each action can be securely controlled.

In order to store new information in a tamper-proof way, the peer-to-peer application can comprise encryption means and/or signature means and/or verification means, wherein at least one of the encryption means and/or signature means and/or verification means is configured to store data, such as a grid control transaction agreement (s), identifier(s), location data, component parameter data set(s), etc. In particular, it can be provided that by the hash function a link is established with at least one previously stored information in the decentral register. Further data, such as request messages, ordinary, contextual and/or transaction data of an entity, such as a provider entity, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present method, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, detecting, registering, testing and/or grid controlling processes can be improved by using the block chain in order to control optimizing process. Thereby, due to the block chain, the optimizing process can be securely performed. E.g. a detecting means can be easily implemented as a smart contract in a block chain.

In addition, the block chain can be used to generate predefined action(s) caused by at least one peer-to-peer module and/or a controlling means in a tamper-proof manner. The block chain according to the present embodiment is particularly a decentralized, peer-to-peer-based register in which all data related to at least one detecting, registering, testing grid controlling and/or switching process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms, such as side chains or smart contracts. A peer-to-peer node can run one or more different block chain client (s).

Data of the peer-to-peer application, such as data related to a controllable electrical device, can be stored on the "decentral ledger technology" and/or the decentral ledger steers (encrypted) data storage arrangements (e.g. comprising one or more device storage(s)) accessible via the internet and preferably in de-central data storage arrangement, object store and database, respectively, such as Interplanetary File System (IPFS) or storj or in a distributed Blockchain database (e.g. BigChainDB). Access to encrypted data to third party entities can be managed via an access control means formed as one or more smart contract(s) on the block chain.

In addition, data feeds can be provided by the peer-to-peer application (so called "smart oracles"). Data feeds can provide further data relating to the grid status from at least one further source. For instance, further currently measured grid frequency values and/or grid voltage values from different measuring locations or the like can be provided by data feeds. It may also be possible that measuring devices comprise a further peer-to-peer module for transmitting the measured data to the peer-to-peer application. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of a controllable electrical device, a second peer-to-peer module of a testing device, etc. A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a controlling process and one or more observing (or monitoring) node(s). An observing node can validate transactions to establish a trust level but does not validate all transactions which is done by the validating peer.

In a further embodiment, the peer-to-peer module is one of the nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node or formed by an embedded controller and a crypto chip/secure element.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as forecasting data, etc., via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment, secure Multi-Party-Computing (sMPC) systems can be used for transactional privacy. Examples for privacy preserving protocols and computation are HAWK and MIT Enigma. Preferably, the optimizing means can be formed by one of these techniques.

With zero knowledge proof (zk Proofs) the parties can see that the algorithm is executed correctly in a private contract, but the input data are not disclosed to the party. In addition, selective privacy can be achieved by sharing keys to decrypt transactions for reporting and auditing purposes.

To securely deploy code and or data into a device a trusted execution environment, such as Intel SGX or TPM or Direct Anonymous Attestation module, can be integrated with a peer-to-peer module.

Similarly, in a further embodiment, a particularly large peer-to-peer network may be divided in two or more (physical or logical or dynamically virtual) cluster(s). In a corresponding peer-to-peer network, for example, a validation (of a subset of transactions) may only be carried out by the members of one cluster (a subset of nodes; e.g. sharding of a block chain to improve the scalability). In a further embodiment, the peer-to-peer application can be formed using multiple block chains. These block chains are connected via frameworks such as sidechains or smart contracts.

A further aspect of the present application is a method for operating at least one electrical grid, the method comprising:
- detecting at least one first peer-to-peer module assigned to at least one controllable electrical device upon a connection of the controllable electrical device with the electrical grid by means of at least one detecting means of at least one peer-to-peer application, wherein the detecting means is executed by at least a part of the nodes of at least one peer-to-peer network,
- communicating with the peer-to-peer application, in particular, in order to provide at least an identifier, e.g. over at least one communication network,
- storing at least one identifier assigned to the detected controllable electrical device and at least one switching pattern of the detected controllable electrical device by means of at least one registering means of the peer-to-peer application, wherein the registering means is executed by at least a part of the nodes of at least one peer-to-peer network.

The method can be used to operate the above described (electrical) grid controlling system.

A further aspect of the present application is a peer-to-peer application. The peer-to-peer application (e.g. a software module) comprises at least one detecting means executable by at least a part of the nodes of the peer-to-peer network and configured to detect at least one first peer-to-peer module assigned to at least one controllable electrical device upon a connection of the controllable electrical device with the electrical grid The peer-to-peer application comprises at least one registering means executable by at least a part of the nodes of the peer-to-peer network and configured to store at least one identifier assigned to the detected controllable electrical device and at least one switching pattern of the detected controllable electrical device.

The peer-to-peer application is implementable of a plurality of nodes of a peer-to-peer network. In particular, the peer-to-peer application can be used in a previously described grid controlling system.

A further aspect of the present application is a first peer-to-peer module assignable to a controllable electrical device. The peer-to-peer module comprises at least one connection detecting means configured to detect an establishment of a connection of the controllable electrical device with at least one electrical grid. The peer-to-peer module comprises at least one communicating means configured to provide at least an identifier of the assignable controllable electrical device and at least one control pattern of the assignable controllable electrical device to at least one peer-to-peer application of at least one peer-to-peer network upon a detection of the connection with the electrical grid in order to register the controllable electrical device in the peer-to-peer application.

The first peer-to-peer module may be integrated in the controllable electrical device.

A still further aspect of the present application is a testing device, in particular, for a transformer station (or a building automation controller, a micro-grid controller, a digital grid router). The testing device comprises at least one second peer-to-peer module configured to receive at least one test parameter data set from at least one peer-to-peer application of at least one peer-to-peer network. The testing device comprises at least one test conducting means configured to conduct at least one test operation of at least one controllable electrical device. The second peer-to-peer module is configured to transmit at least the test result to the peer-to-peer application of at least one peer-to-peer network.

The testing device may be integrated in a transformer station. The testing device may be used for a previously described grid controlling system.

It shall be understood that the aspects and embodiments of the present application can also be applied to heat grids and gas grids including power-to-heat, power-to-gas or gas-to-heat devices.

The features of the methods, systems, peer-to-peer modules, peer-to-peer applications, testing devices, and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
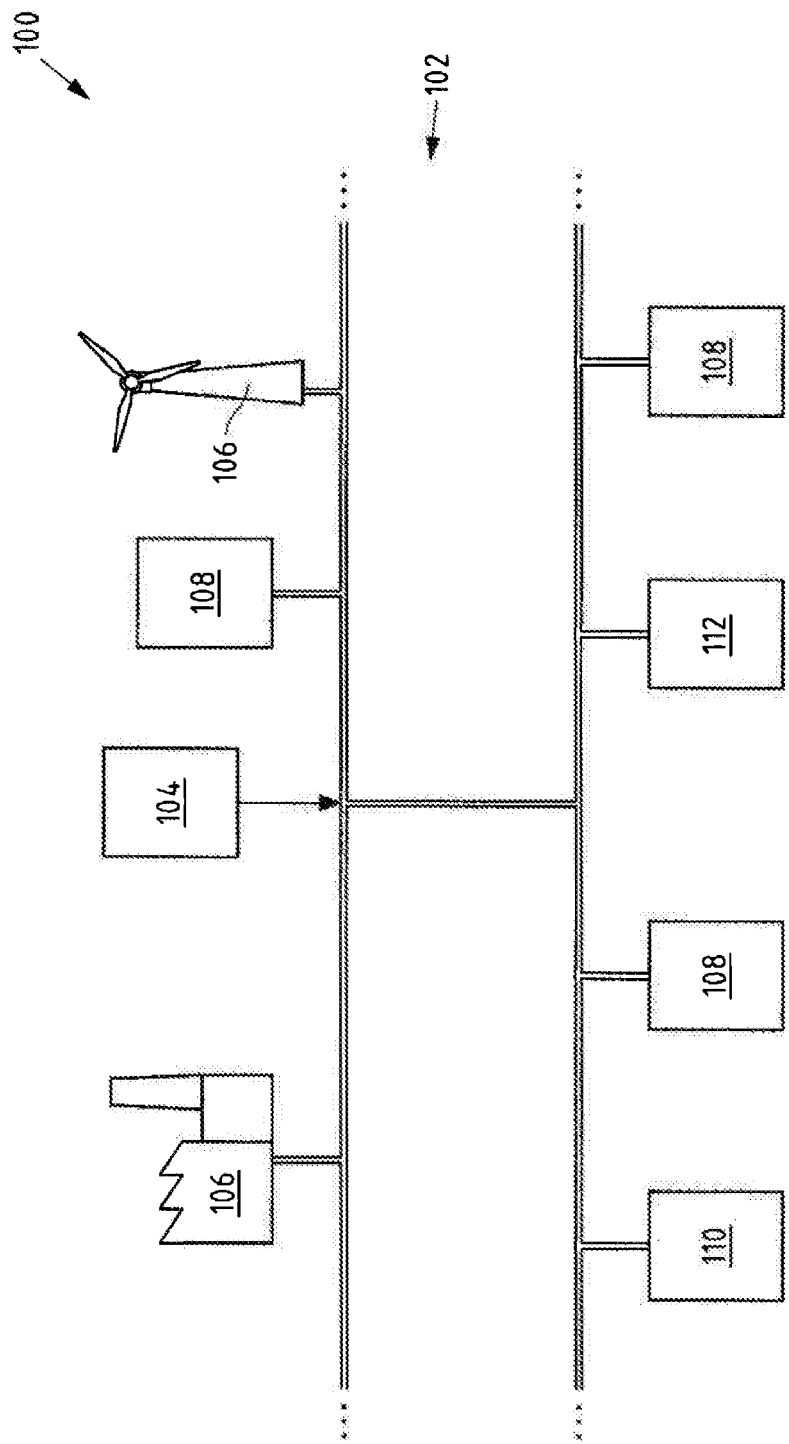
FIG. 1 is a schematic view of a grid control system according to prior art.

Like reference numerals in different figures indicate like elements.

Figure 2:
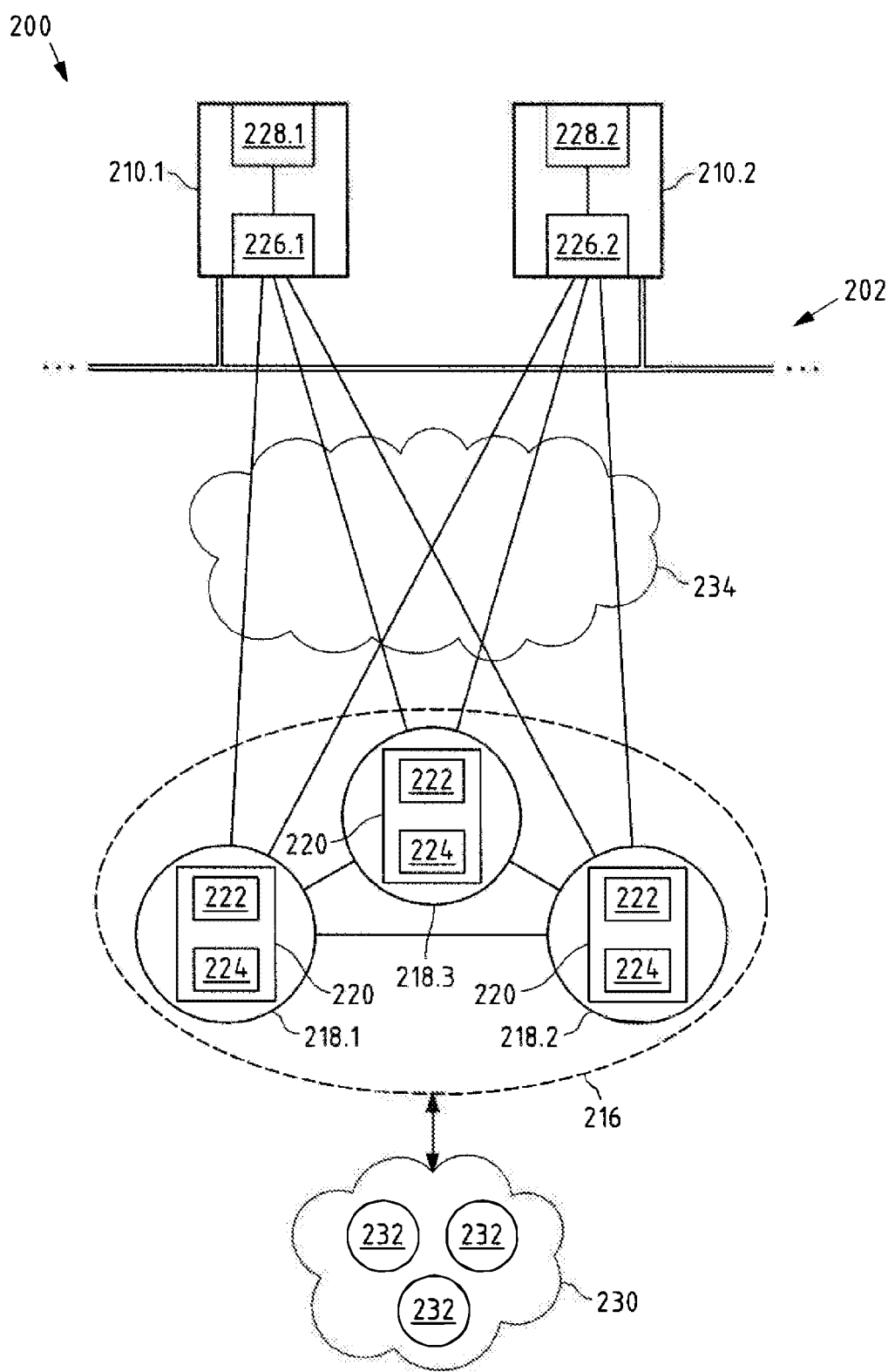
FIG. 2 is a schematic view of an embodiment of a grid control system according to the present application.

FIG. 2 shows a schematic view of an embodiment of a grid control system 200 according to the present application. The grid control system 200 comprises at least one peer-to-peer network 216 comprising at least one peer-to-peer application 220 configured to control and manage at least one electrical grid 202. For instance, controlling the electrical grid 202 can include keeping at least one electrical grid parameter, in particular, the grid voltage and/or the grid frequency (sufficiently) steady.

Generally, a plurality of electrical devices 210.1, 210.2 comprising loads, producers, storages, etc. are connected with the electrical grid 202. At least some of the connected electrical devices 210.1, 210.2 might be controllable electrical devices 210.1, 210.2. According to the present application, a controllable electrical device 210.1, 210.2 can be controlled by the peer-to-peer application 220. In particular, a controllable electrical device 210.1, 210.2 is a flexibility 210.1, 210.2 providing (positive or negative) control power, i.e. may be regarded as a reserve to compensate for load and demand fluctuations. Exemplified and not-exhaustive examples of controllable electrical devices 210.1, 210.2 include cooling houses, compressed air generators, hydraulic systems, climatic chambers, electrical vehicles, photovoltaic devices, wind turbines, etc.

A substantial difference compared with prior art techniques is that no central instance and/or third party organization is provided. In the present case, the grid control system 200 comprises a peer-to-peer network 216 or a computer-computer network 216. The peer-to-peer network 216 comprises a plurality of nodes 218.1, 218.2, 218.3 and computers 218.1, 218.2, 218.3, respectively. A peer-to-peer network 216 is characterized in the present case in that each node 218.1, 218.2, 218.3 and/or participant 226.1, 226.2 is preferably connectable at least to every other node 218.1, 218.2, 218.3 and/or participant 226.1, 226.2.

For instance, at least one physical standard communication network 234 (wired and/or wireless) can be used for connection. For communicating via the at least one physical standard network suitable transceiver modules may be arranged in the respective entities/devices. For instance, the Internet can be used.

In addition, the nodes 218.1, 218.2, 218.3 have equal rights, something which distinguishes them from a server-client structure.

The depicted nodes 218.1, 218.2, 218.3 (each) comprise a peer-to-peer application 220. As can be seen from FIG. 2, the same peer-to-peer application 220 is preferably implemented on each node 218.1, 218.2, 218.3. This means, in particular, that the same (data) content is comprised on each node 218.1, 218.2, 218.3 and that the same code (e.g. detecting means 222 in form of a smart contract, registration means 224 in form of a smart contract, etc.) is executed on each node 218.1, 218.2, 218.3.

The peer-to-peer application 220 may preferably be a public register 220 or a decentral ledger 220 that can, in particular, be inspected by all participants 218.1, 218.2, 218.3, 226.1, 226.2 (not only the nodes 218.1, 218.2, 218.3) of the peer-to-peer network 216. Each node 218.1, 218.2, 218.3 preferably has the (entire) public register 220. It may also be envisaged that only part of the register can be provided on a node (light node). In a particularly preferred embodiment, the peer-to-peer application 220 may be a block chain 220 which will be explained in more details hereinafter. It shall be understood that the peer-to-peer network may comprise further nodes. In addition, it shall be understood that also a controllable electrical device can be formed as a node of the peer-to-peer network.

The peer-to-peer network 216 is, in particular, configured to provide an automatic detection and/or registration of controllable electrical devices (newly) connected to the electrical grid 202. In particular, the peer-to-peer application 220 may comprise a detecting means 222 at least configured to detect a controllable electrical device (for instance, controllable electrical device 210.2) not already registered and a registering means 224 configured to register the detected controllable electrical device 210.2. By (automatically) detecting and registering controllable electrical devices 210.1, 210.2 the managing and operating of a steady electrical grid can be facilitated. Since the detection and registration of the at least one controllable electrical device 210.2 is realized by a peer-to-peer application 220, said processes can be conducted in a secure manner. Manipulations can be avoided.

In order to be detectable by the peer-to-peer network 216 and peer-to-peer application 220, respectively, according to an embodiment of the present application, a first peer-to-peer module 226.1, 226.2 can be provided. More particularly, a peer-to-peer module 226.1, 226.2 is (generally) configured to communicate at least with the peer-to-peer network 216, i.e. the nodes 218.1, 218.2, 218.3 of the peer-to-peer network 216. In other words, the peer-to-peer module 226.1, 226.2 or the controllable electrical device 210.1, 210.2 corresponding and/or assigned to the respective peer-to-peer module 226.1, 226.2 is at least a participant of the peer-to-peer network 216. Preferably, all participants 218.1, 218.2, 218.3, 226.1, 226.2 (including all nodes) of the peer-to-peer network 216 are known to each participant 218.1, 218.2, 218.3, 226.1, 226.2 of the peer-to-peer network 216.

In the present case, the first peer-to-peer modules 226.1, 226.2 are not nodes of the peer-to-peer network 216 but only participants 226.1, 226.2. While nodes 218.1, 218.2, 218.3 in the peer-to-peer network 216 comprise at least a part of the peer-to-peer application 220 itself, a participant of a peer-to-peer network 226.1, 226.2, like the present peer-to-peer modules 226.1, 226.2, does not comprise the peer-to-peer application 220. Such a peer-to-peer module 226.1, 226.2 is configured to provide (only) access to the peer-to-peer application 220 e.g. via an API (application programming interface). Each peer-to-peer module 226.1, 226.2 (also a node or light node) may comprise a decentral application and at least an API.

In the case, the peer-to-peer module is formed as a (light) node of the peer-to-peer network the peer-to-peer module (also) comprises at least partly the peer-to-peer application 220. It shall be understood that a peer-to-peer module 226.1, 226.2 might be a node of the peer-to-peer network 216. It shall be understood that a peer-to-peer module 226.1, 226.2 may have access or may be connected to a "gateway" running a node of the peer-to-peer network.

The first peer-to-peer module 226.1, 226.2 may comprise a (not shown) connection detecting means configured to detect e.g. an (initial) establishment of the respective controllable electrical device 210.1, 210.2 with the electrical grid 202. For instance, a current flow or applied voltage can be detected. Upon detection of the connection with the electrical grid, the first peer-to-peer module 226.1 is detectable by the detecting means 222, in particular, e.g. by setting a respective flag and/or by enabling to read out at least an identifier assigned to the controllable electrical device from a storage module 228.1, 228.2 at least controlled by the first peer-to-peer module 226.1, 226.2. As will be described hereinafter, there are different possibilities to detect a first peer-to-peer module 226.1, 226.2, and thus, the corresponding controllable electrical device 210.1, 210.2, which will be described hereinafter.

Besides the (unique) identifier, further data can be stored in the storage module 228.1, 228.2. For instance, at least one switching scheme created for and e.g. by the controllable electrical device can be stored in the storage module 228.1, 228.2. More particularly, an intervention in the (not shown) load or producer control unit may require precise knowledge of the control routine. Hence, controlling a switching of a load or producer by the peer-to-peer network 216 might be difficult, in particular if different types of loads (or producers) or load (or producer) control units are to be controlled by the peer-to-peer network 216.

In order to simplify this intervention in the switching behavior of the controllable electrical devices 210.1, 210.2, at least one load (or producer) switching scheme can be provided to the peer-to-peer application. In this case, it is possible to evaluate in each case locally by the respective controllable electrical device 210.1, 210.2 in which time periods and for which duration a switching of the load/producer is possible. Such a switching scheme is, in particular, designed for the power requirement of the controllable electrical device 210.1, 210.2. For instance, there may be different storage capacities for loads 210.1, 210.2. E.g. a cooling house 210.1, 210.2, once cooled down to a certain temperature, may remain cooled for a certain period without electrical energy. This storage capacity of potential energy is different for each load and leads to different possibilities of designing switching schemes for different loads. The same applies for producers and/or prosumers.

In a switching scheme, a flexibility of the switching time can be stored. For instance, in a switching scheme, at least one switching window, that is to say a certain period, can be specified, within which the load/producer must be switched for a period shorter than the period. The respective control device can then independently determine when a switching is actually performed, as long as the switching process is carried out in the switching window, with a selected load switching scheme.

In addition, a switching pattern of the controllable electrical device 210.1, 210.2 can be stored in the storage module 228.1, 228.2. For instance, the at least one switching pattern of the controllable electrical device 210.1, 210.2 can be assigned to the at least one switching scheme of said controllable electrical device 210.1, 210.2. A switching pattern according to the present application represents the time profile of the electrical power of the controllable electrical device 210.1, 210.2 during a switching process. A load profile can be stored together with the switching scheme. The switching pattern and/or the switching scheme is, in particular, stored such that the detecting means 222 can read out said information via the peer-to-peer module 226.1, 226.2.

The switching pattern and profile, respectively, can also be referred to as a performance profile. The switching pattern may be recorded as a function of the switching plan. A switching pattern can be used by the peer-to-peer application to select a suitable switching scheme in which the switching pattern is used to adjust the switching performance to a requirement of (negative or positive) control energy for controlling the electrical grid. In particular, the time profile of the consumed/produced power of the switched electrical devices can be adapted to a time curve of the required (negative or positive) control energy.

As can be further seen from FIG. 2, a storage arrangement 230 is provided. For instance, a registry storage can be formed by the storage arrangement 230. Data can be stored in the peer-to-peer application 220 and/or in the storage arrangement 230 controlled by the peer-to-peer application 220. Preferably, the storage arrangement 230 comprising a plurality of decentral storage units 232 may be formed as a decentral file system (such as IPFS) or a decentral object store (such as storj) or a decentral distributed database (such as BigchainDB) controlled by the peer-to-peer application 220. For instance, an identifier list of all controllable electrical devices 210.1, 210.2 registered in the peer-to-peer application 220, a device storage, etc., can be stored in and/or formed by the storage arrangement 230. Controlling the storage arrangement 230 may comprise controlling the read and write privileges of the storage arrangement 230. Preferably, at least one (not shown) access controlling means of the peer-to-peer application 220 can be provided for handling the access to the storage by other peer-to-peer modules (e.g. of third parties).

Figure 4:
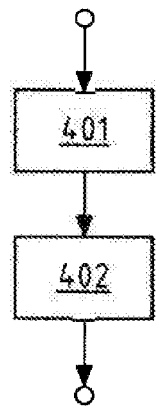
FIG. 4 is a diagram of an embodiment of a method according to the present application.

The functioning of the depicted system 200 will be explained by the aid of FIG. 4. FIG. 4 shows a diagram of an embodiment of a method according to the present application. FIG. 4 shows, in particular, a method for detecting and registering a controllable electrical device 210.1, 210.2. For the following exemplified explanation of the method, it will be assumed that the controllable electrical device 210.2 is a load which is firstly connected to the electrical grid 202.

In a first step 401, the detecting means 222 may be executed by at least a part of the nodes 218.1, 218.2, 218.3 (>1), in the present example, all nodes 218.1, 218.2, 218.3 of the peer-to-peer network 216 such that at least the first peer-to-peer module 226.2 assigned to the load 210.2 is detected upon a connection of the controllable electrical device 226.2 with the electrical grid 202.

For instance, the detecting means 222 can comprise a crawling function configured to detect the load 210.2 and the first peer-to-peer module 226.2, respectively. For instance, upon detecting an initial connection of the load 210 with the electrical grid 202 by the peer-to-peer module 226.2, the peer-to-peer module 226.2 can set a respective information (e.g. flag) detectable by the detecting means 222 through the crawling function. Another example may be that the detecting means (regularly) detects the identifiers of essentially all connected first peer-to-peer modules and compares the identifiers with the identifiers of already registered controllable electrical devices 210.1. If an identifier cannot be matched with already stored identifiers, the load can be registered (see step 402). Another option might be that upon detecting an initial connection of the load 210 with the electrical grid 202 by the first peer-to-peer module 226.2, the first peer-to-peer module 226.2 may transmit a registering request message comprising at least the identifier of load 210.2 to the peer-to-peer application 220 such that the detecting means 222 can detect said message.

In the next step 402, the first peer-to-peer module 226.2 (and thus the load 210.2) can be registered in the peer-to-peer application 220. In this step 402, the registering means 224 may be executed by at least a part of the nodes 218.1, 218.2, 218.3 (>1), in the present example, all nodes 218.1, 218.2, 218.3 of the peer-to-peer network 216 such that at least the identifier assigned to the detected load 210.2 and at least one switching scheme and/or at least one switching pattern of the detected load 210.2 is stored e.g. in a registry storage. For instance, upon detection of a new first peer-to-peer module 226.2, the respective data set(s) (identifier and switching scheme and/or switching pattern) can be provided by the first peer-to-peer module 226.2 e.g. by transmitting respective message(s) comprising said data set(s).

Additional data can be provided by the first peer-to-peer module 226.2. For instance, a location parameter data set indicating the location of the load 210.2 can be provided to the peer-to-peer application 220. For instance, the location parameter data set can be based on a GPS sensor (or a similar sensor or by analysis of an IP address). It may be also possible that the location parameter data set includes the location parameter(s) of the next transformer station and/or the corresponding meter of the load. Alternatively or additionally, a location parameter data set can be manually input. Eventually, a grid control transaction criterion set by the load 210.2 can be provided to the peer-to-peer application 220.

In order to register the load 210.2, preferably, all received data set(s) are stored in a registry storage e.g. formed by the peer-to-peer application 220. In a preferred embodiment, the registry storage is formed by the storage arrangement 230 controlled by the peer-to-peer application 220.

The stored data, in particular, the switching pattern(s) and/or switching scheme(s) and e.g. the position of the registered controllable electrical device(s) 210.1, 210.2 within the grid 202 can be used by the peer-to-peer application 220 and network 216, respectively, to (locally) control the electrical grid 202.

Figure 3:
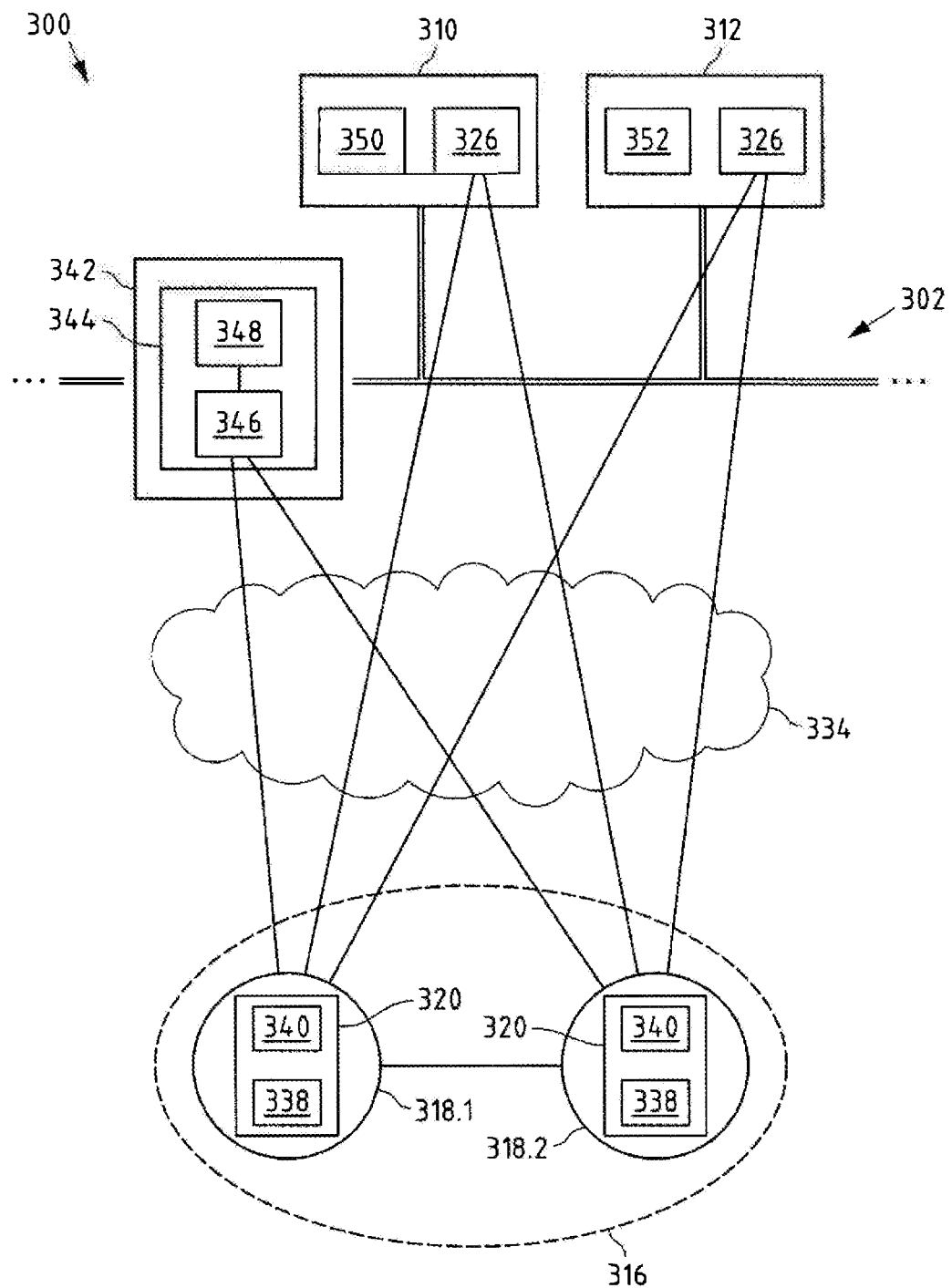
FIG. 3 is a schematic view of a further embodiment of a grid control system according to the present application.

FIG. 3 shows a schematic view of a further embodiment of a grid control system 300 according to the present application. The depicted grid control system 300 comprises a peer-to-peer network 316 with a plurality of nodes 318.1, 318.2 configured to control and manage at least one electrical grid 302. For the sake of clarity, only two nodes 318.1, 318.2 are depicted.

As can be further seen, each node 318.1, 318.2 comprises the same peer-to-peer application 320. In the present case, the same peer-to-peer application 320 comprises at least one testing means 338 and at least one storing means 340. It shall be understood that the peer-to-peer application 320 can also comprise a detecting means and/or a registering means, as previously described. Thereby, the storing means 340 might be formed by the previously described registering means.

Further, at least one testing device 344 is provided. In the present embodiment, a second peer-to-peer module 346 is integrated in the testing device 344. The testing device 344 comprises also a test conducting module 348. Preferably, the testing device 344 is integrated in a transformer station 342 of the electrical grid 302. The transformer station 342 may be located between e.g. a medium-voltage grid and a low-voltage grid 302.

As can be further seen from FIG. 3, two exemplified controllable electrical devices 310, 312 (e.g. a load 310 and a producer 312) are connected with the electrical grid 302. It shall be understood that three or more (controllable) electrical devices are usually connected with the electrical grid 302. Each controllable electrical device 310, 312 comprises a first peer-to-peer module 326 and a control unit 350, 352 configured to control the switching of the respective load or producer.

Figure 5:
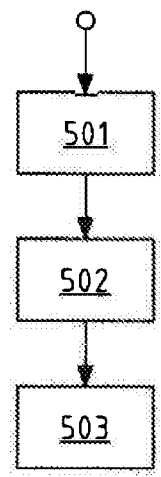
FIG. 5 is a diagram of a further embodiment of a method according to the present application.

The functioning and operation of the system 300 will be described in connection with FIGS. 5 and 6. FIG. 5 shows a diagram of a further embodiment of a method according to the present application. In particular, an embodiment of a method for conducting a test operation under the control of the peer-to-peer application 320 is depicted in FIG. 5. For the following examples, it is assumed that the load 310 is tested. In a similar way, a producer 312 can be tested.

More particularly, following steps can be conducted on the peer-to-peer network 316. In a first step 501, the testing means 338 may be executed by at least a part of the nodes 318.1, 318.2 (>1), in the present example, all nodes 318.1, 318.2 of the peer-to-peer network 316 such that at least one test operation for determining the actual switching behavior of the load 310 is initiated. Initiating a test operation, in particular, comprises transmitting of at least one test request message to the second peer-to-peer module 346 of the testing device 340. The test request message may comprise at least one test parameter data set. For instance, the test parameter data set may comprise the (unique) identifier of the load 310 to be tested. Further data may be an instruction to conduct at least one test operation and/or a test operation setup. In particular, the test parameter data set comprises all information required by the testing device 340 in order to test one or more specific controllable electrical device(s) 310.

In the next step 502, the peer-to-peer application 320 may receive a test result of a conducted test operation. The received data set(s) of the test result may be provided by the second peer-to-peer module 346 to the testing means 338. The data set(s) may comprise an identifier relating to a previously transmitted test request message and/or the identifier of the tested load 310.

Then, in step 503, the test result may be stored. The storing means 340 (e.g. the registering means) may be executed by at least a part of the nodes 318.1, 318.2 (>1), in the present example, all nodes 318.1, 318.2 of the peer-to-peer network 316 such that the test result is stored e.g. in the above described (inspectable) registry. The test result may comprise a test protocol and/or an actual switching pattern and/or actual switching scheme and/or parameter values allowing deriving the actual switching pattern. Storing the test result may include at least to store the actual switching pattern and/or to adapt an already stored switching pattern according to the actual switching pattern and/or according to said parameter values. Storing can further comprise adapting a reputation factor assigned to said load 310 and adapting a switching scheme.

It is noted that the testing process (see steps 501 to 503) may be conducted prior to or during the registering process (see FIG. 4). For instance, the initial switching pattern can be determined and registered upon the conduction of the test operation. Furthermore, it is noted that the test request message can comprise a test parameter data set for a common test operation of two or more (specific) controllable electrical devices 310, 312. It is noted that the process can be applied for a virtual controllable electrical device as well.

Figure 6:
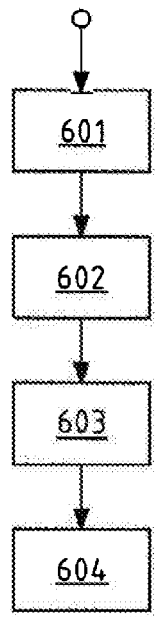
FIG. 6 is a diagram of a further embodiment of a method according to the present application.

FIG. 6 shows a further embodiment of a method according to the present application. More particularly, following steps can be conducted by the testing device 344.

In a first step 601, the testing device 344, in particular, the second peer-to-peer module 346 assigned to said testing device 344 may receive at least one test request message, e.g. as described above. Based on the test parameter data set of the received test request message the test conducting module 348 may initiate the at least one test operation by sending at least one test (request) signal to the load 310 to be tested (step 602). For instance, the test signal can be send via the power line of the electrical grid 302 and/or via another network. The test signal may be, in particular, sent to the control unit 350 of the load 310 in order to cause one or more switching action(s). It shall be understood that two or more test (request) signals may be sent.

The test signal may cause the control unit 350 to conduct at least one switching action in accordance with the test signal. The load profile can be (locally) measured by means of a power measurement during a switching process, i.e. between the load switching on and off (and/or vice versa). This load profile can be stored together with the switching scheme. The test result, i.e. the locally determined information, can then be transmitted to the testing device 344. This means that the test conducting module 348 may receive the test result (step 603). It may also be possible that the power measurement takes place in the testing device (step 603). The load profile can also be referred to as a performance profile. The load profile assigned to a switching scheme can be referred to as a switching pattern, since a performance pattern is recorded as a function of the switching scheme.

Further, in step 604, the test result (e.g. including an actual switching pattern and/or a test protocol) can be provided from the second peer-to-peer module 346 to the peer-to-peer application 320. For instance, at least one message with data set(s) comprising the test result can be transmitted to the testing means 338, e.g. as described above.

Figure 7:
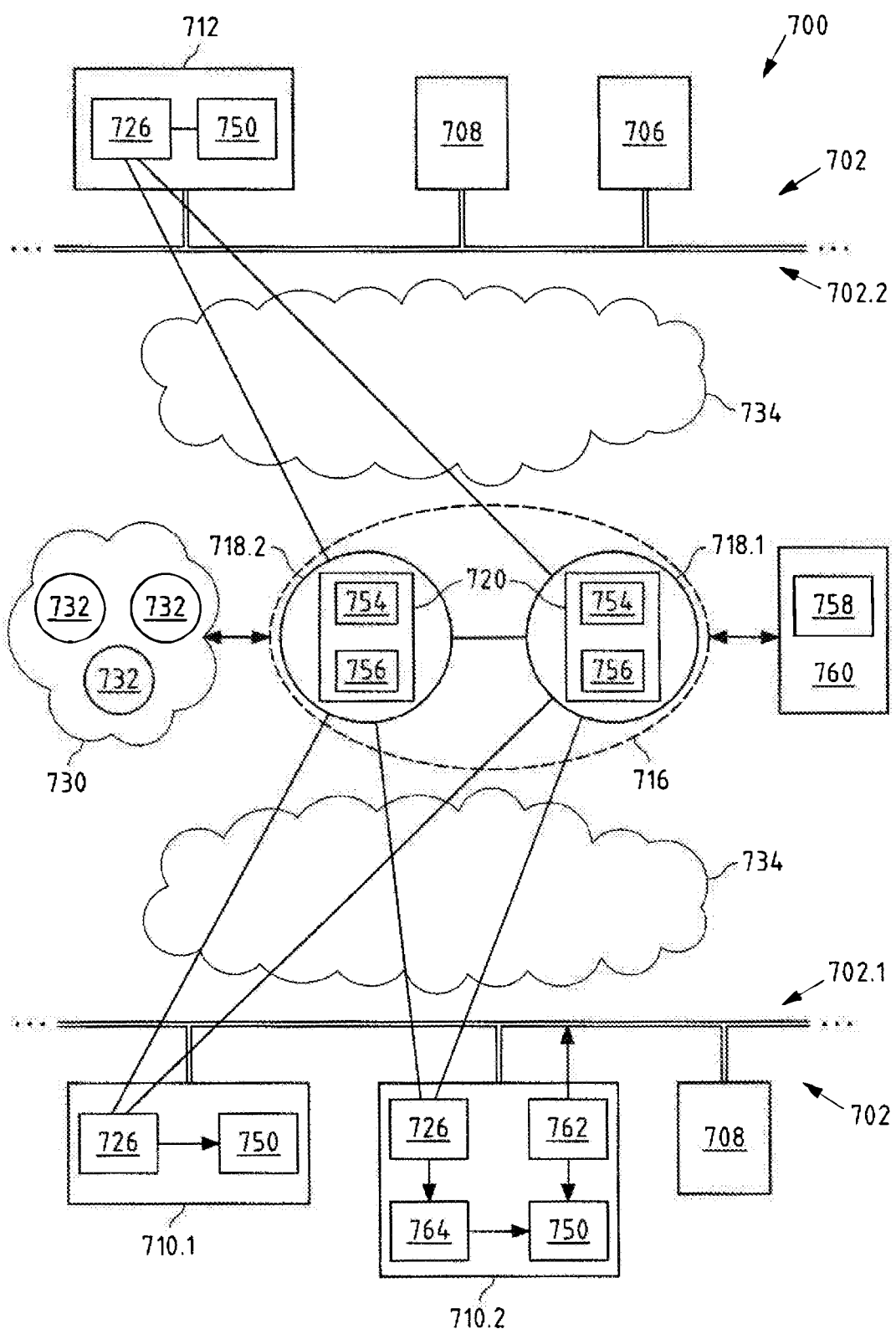
FIG. 7 is a schematic view of a further embodiment of a grid control system according to the present application.

FIG. 7 shows a schematic view of a further embodiment of a grid control system 700 according to the present application. The depicted grid control system 700 comprises a peer-to-peer network 716 with a plurality of nodes 718.1, 718.2 configured to control and manage the electrical grid 702 comprising a first sub grid 702.1 and at least one further sub grid 702.2. For the sake of clarity, only two nodes 718.1, 718.2 are depicted.

Each sub grid 701.1, 701.2 may comprise (non-controllable) electrical devices 706, 708 (e.g. producers 706 and loads 708). Further, controllable electrical devices 710.1, 710.2, 712 are provided and connected with the electrical grid 702. Each controllable electrical device 710.1, 710.2, 712 comprises a first peer-to-peer module 726. Further, each controllable electrical device 710.1, 710.2, 712 may comprise a control unit 750, 752. In addition, the exemplified controllable electrical device 710.2 comprises at least one measuring module 762 and at least one code storage module 764. The functioning will be described hereinafter.

As can be further seen from FIG. 7, each depicted node 718.1, 718.2 comprises the same peer-to-peer application 720. In the present example, the peer-to-peer application 720 comprises a creating means 754 and a grid controlling means 756. It shall be understood that the peer-to-peer application 720 can also comprise a detecting means and/or a registering means, as previously described, and/or a testing means and/or storing means, as previously described.

The grid control system 700 comprises at least one off-chain computing device 758 comprising at least one analyzing means 760. Preferably, a particular powerful off-chain computing device 758 and entity 758, respectively, can be provided. The peer-to-peer application 720 may be configured to control the at least one analyzing process conducted by the off-chain computing device 758. Controlling may include communicating with the off-chain computing device 758. Controlling may further include monitoring the analyzing process by at least a part (e.g. >1) of the nodes 718.1, 718.2 of the peer-to-peer network 716. Manipulation of the analyzing process can be avoided. It is noted that the off-chain device can be a trusted execution environment.

The analyzing means 760 may be configured to analyze a plurality of registered controllable electrical devices 710.1, 710.2, 712 based on the respective individual switching pattern(s), the respective individual test result(s) including test protocol(s), common test result(s) of two or more of these controllable electrical devices 710.1, 710.2, 712, historical control action(s) and/or the respective reputation factors. All these data may be stored in the registry in the storage arrangement 730. The peer-to-peer application 720 may be configured to handle the data transfer between the storage arrangement 730 and the off-chain computing device 758. The at least one analyzing means may include one or more of the following analyzing (optimizing) tools: Artificial Intelligence algorithm(s), Machine learning algorithm(s), Neuronal networks, etc.

The analyzing means might optimize the set-up or pricing of virtual controllable electrical devices and/or create local (autonomous) response parameters that are stored in and executed by individual controllable electrical devices. Trusted execution environments might be used in the controllable electrical devices to ensure a secure deployment of these patters or parameters.

In addition, the system comprises a storage arrangement, e.g. as described hereinbefore. Further, it is noted that a plurality of measuring devices can be provided and configured to deliver current grid status parameters to the peer-to-peer application 720. In addition, a control scheme can be estimated/determined based on weather data, smart meter data, asset data, usage data, condition data, etc. In particular, these data can be analyzed and control scheme forecast can be created by the creating means.

Figure 8:
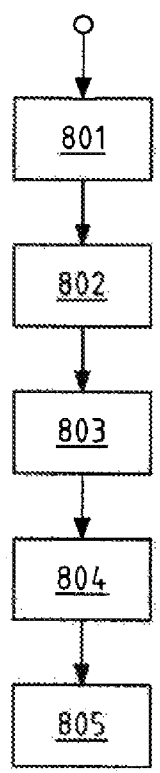
FIG. 8 is a diagram of a further embodiment of a method according to the present application.

The function and operation of the grid control system 700 will be described in connection with FIG. 8. FIG. 8 shows a scheme of a further embodiment of a method according to the present application.

In an optional first step 801, the data stored in the registry can be analyzed, as described above. Based on the analysis result, one or more control scheme(s) can be created by the creating means 754 (step 802). In particular, the creating means 754 may be executed by at least a part of the nodes 718.1, 718.2 (>1) such that at least one control scheme is created based on a current or estimate (future) grid condition (e.g. grid voltage and/or grid frequency) and on at least a part of the stored switching patterns of the registered controllable electrical devices 710.1, 710.2, 712. In addition, the analysis result can be taken into account by the creating means 754. Preferably, the creation of a control scheme can be conducted in (almost) real-time based on the current grid condition(s). It may also be possible that a control scheme is created which is a function of possible grid conditions. It may be possible to create a control scheme locally by an individual controllable electrical devices.

In a next step 803, at least one of the registered controllable electrical devices 710.1, 710.2, 712 is controlled by the grid controlling means based on a grid status and on at least one created control scheme. By way of example, a current grid frequency of the first sub grid 702.1 and a current grid frequency of the at least one further sub grid 702.2 can be provided by (not shown) measuring devices to the peer-to-peer application 720. For instance, if it is detected that the provided current grid frequency of the further sub grid 702.2 increases (or decreases) a preset limit the grid controlling means 756 may send an instruction code data set to the controllable electrical device 712 e.g. to cause a (directly) switching operation in order to reduce (or increase) the current grid frequency of the further sub grid 702.2. The choice of the controllable electrical device 712 to be switched may be also dependent on the location of the controllable electrical device 712.

In a further embodiment, controlling includes the provision of an instruction code data set to a first peer-to-peer module 726 such that the respective controllable electrical device 710.2 can be (autonomously) operated in accordance with the provided instruction code data. For instance, based on estimated fluctuation scenarios (e.g. according to the "traffic light concept"), one or more switching rule(s) can be created for a controllable electrical device 710.2. The grid controlling means 756 may transmit the one or more switching rule(s) to the first peer-to-peer module 726 such that the one or more switching rule(s) are implemented, e.g. stored in a memory module 764 (or a digital product memory) of the controllable electrical device 710.2. The controllable electrical device 710.2 may comprise a measuring module 762 configured to (continually) measure at least one electrical grid parameter. Based on the at least one measured electrical grid parameter and the installed one or more switching rule(s), the control unit 750 may operate (e.g. conduct a switching operation or reduce/increase a power draw) the controllable electrical device 710.2. Switching rules may also comprise instructions for reactivating a controllable electrical device after a blackout. For instance, order, behavior and mutually controlling can be determined by said switching rules.

Controlling can also include the monitoring of any switching action and storing a switching protocol in the peer-to-peer application 720. For instance, the respective peer-to-peer module 726 may transmit switching protocols to the peer-to-peer application 720.

In step 804, a grid control transaction criterion process can be conducted. Preferably, at least an agreed amount of cryptocurrency can be transferred to an account assigned to the controllable electrical device 712, 710.1, 710.2 for conducting one or more switching action(s)/operation(s).

Further, in step 805 (which can be continuously conducted), an analyzing means may analyze stored data (historical switching protocols, test results, changes of the electrical grid, control schemes, switching patterns, switching rules, etc.) in order to optimize the management and control of the electrical grid 702 or to update control parameters and/or local (autonomous) response parameters.

It shall be understood that at least some of the previously described steps can be conducted at least partly in parallel.

Figure 9:
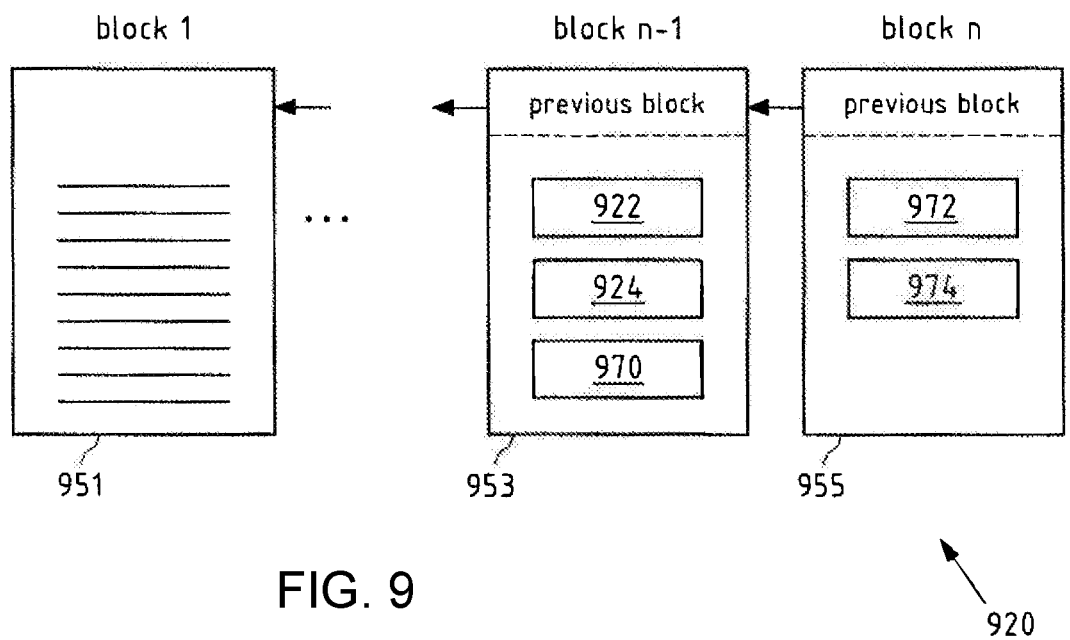
FIG. 9 is a schematic view of an embodiment of a peer-to-peer application according to the present application.

FIG. 9 shows a further schematic view of an embodiment of a peer-to-peer application 920 according to the present application.

The depicted peer-to-peer application 920 is a register or distributed ledger readable, in particular, by the participants of the peer-to-peer network. Thereby, data (set(s)) e.g. in form of messages can be written and/or read into/from the register 920 by a peer-to-peer module assigned to an controllable electrical device, testing device and/or any other participants in the peer-to-peer network. In a preferred embodiment, the peer-to-peer application 920 may be a block chain 920.

Hereinafter, it is assumed in the following description of the present embodiment that the at least one peer-to-peer application 920 is a block chain 920. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application, the block chain can be a permissionless or permissioned block chain. In a specific case the block chain can be public, consortium or private block chain.

In a further embodiment, the peer-to-peer application can be formed with multiple block chains which are connected via mechanisms, such as side chains or smart contracts. Interoperability among block chains can be established.

The block chain 920 is formed by at least one block 951, 953, 955, preferably by a plurality of interconnected blocks 951, 953, 955. The first block 951 may also be called genesis block 951. As can be seen, a block 953, 955 (except for the first block 951) refers to each previous block 951, 953. A new block can be created by a computationally intensive process (for example, so called "mining" or through another appropriate process, such as voting) and will be particularly provided to all participants of the peer-to-peer network. In a further embodiment a (centrally controlled) master node or a set of master nodes may be configured to create new blocks and/or validating transactions. All other nodes can be validation nodes only.

The present block chain 920 is particularly adapted to receive messages, such as messages comprising instruction data set(s), test results, switching protocols and/or registering data, authentication result(s), etc., from a peer-to-peer module of a previously described controllable electrical device, (off-chain) computing entity or from another peer-to-peer module of another participant of the peer-to-peer network. Further, the block chain 920 is particularly adapted to save these messages in the block chain 920. Furthermore, the block chain 920 is configured to generate messages e.g. based on analyzing process, test results, detection results, an authentication or authorization process and/or caused by a peer-to-peer module and/or the execution of code of e.g. a detecting means 922 or registering means 924. In particular, the block chain 920 is at least configured to control and manage a grid control system, such as shown in FIG. 2, 3 or 7.

In particular, a (newly) received message can be saved and published in the current block 955 of the block chain 920. Due to the configuration of a block chain 920 as a public register 920, said data message of e.g. a peer-to-peer module can be read by preferably all participants of the peer-to-peer network. Alternatively or additionally, data of a message may be stored on a central file service, a decentral file service or distributed block chain database (e.g. storage arrangement 230) controlled by the block chain 920.

As already described, in the present block chain 920 different types of messages and data sets, respectively, for example, within a smart contract (algorithm and/or storage at the block chain 920) can be processed and/or stored. In the present example, the block chain 920 comprises a detecting means 922 in form of a smart contract 922 and a registering means 924 in form of a smart contract 924. As previously described, the detecting means 922 may be configured to detect a newly arranged controllable electrical device and the registering means 924 may be configured to register said controllable electrical device.

Furthermore, in the block chain 920 one or more grid control transaction agreement(s) 970 may be stored. A grid control transaction agreement 970 may be generated between two (or more) entities in order to define the details of a control process related to a controllable electrical device. An example of a generation of such a grid control transaction agreement 970 will be described in the following:

A grid control transaction agreement 970 may comprise at least one of the following data:

Identifier(s): One or more identifier(s) of the involved entities, such as an identifier(s) of the grid operator, identifier(s) of controllable electrical device(s), etc.

Grid control transaction criterion: Criterion that must be fulfilled for allowing the peer-to-peer application to use said controllable electrical device(s)

Key(s) Information about key(s) used to encrypt and/or sign data communication or mechanism to exchange keys Control detail(s): Registering rule(s), switching pattern, control schemes, switching rules The grid control transaction criterion may be e.g. an amount of cryptocurrency e.g. per switching action or a flat amount which has to be transferred prior to, during and/or after one or more switching action(s). Preferably, at least a part of the agreed amount of cryptocurrency can be locked by the peer-to-peer application 920 prior to a switching action. In an embodiment, the grid control transaction criterion may be a payment channel for streaming small amounts of crypto tokens per each time and/or data unit. It shall be understood that other transaction criteria and further information can be included in a grid control transaction agreement 970. More information/criteria can be, for example, a time stamp, an ID of the transaction and the like.

In order to generate a grid control transaction agreement 970, for example a first peer-to-peer module of a controllable electrical device and the peer-to-peer application (e.g. the registering means) can exchange request and response (acceptance) messages via the peer-to-peer application 970 (e.g. during a registering process). A request message 972 may comprise indications about the above data (identifications, transaction criteria, etc.).

Another message 974 may be an acceptance message 974 of e.g. the registering means 924. An acceptance message 974 may comprise identical or at least similar data details as compared with a request message 972. Additionally, the acceptance message 974 can comprise a reference indication to a previous message, such as the ID of the message 972. The acceptance message 974 can be provided by a further peer-to-peer module or by the peer-to-peer application (e.g. according to preset rules).

If, for example, the acceptance message 974 comprises a higher or other transaction criterion and/or other desired control details, the acceptance/request message 974 can be called a counter-offer message. This can be accepted by the peer-to-peer module of the controllable electrical device through an acceptance message. Based on this a peer-to-peer module of an entity or the peer-to-peer application e.g. by means of the registering means 924 may cause the generation of a grid control transaction agreement 970 about one or more switching and/or control process(es).

In particular, there can be multiple request messages and/or accepting messages. Each entity can give guidelines, according to which at least one grid control transaction agreement 970 or other agreements can be generated. In a preferably automated, such as iterative, process each request message can be associated to an optimally corresponding acceptance message. The block chain 920 may be configured to generate, based on the messages of a peer-to-peer module, a grid control transaction agreement 574. In a similar way, other transaction agreements e.g. with a testing device and about the services provided by a testing device can be generated.

Figure 10:
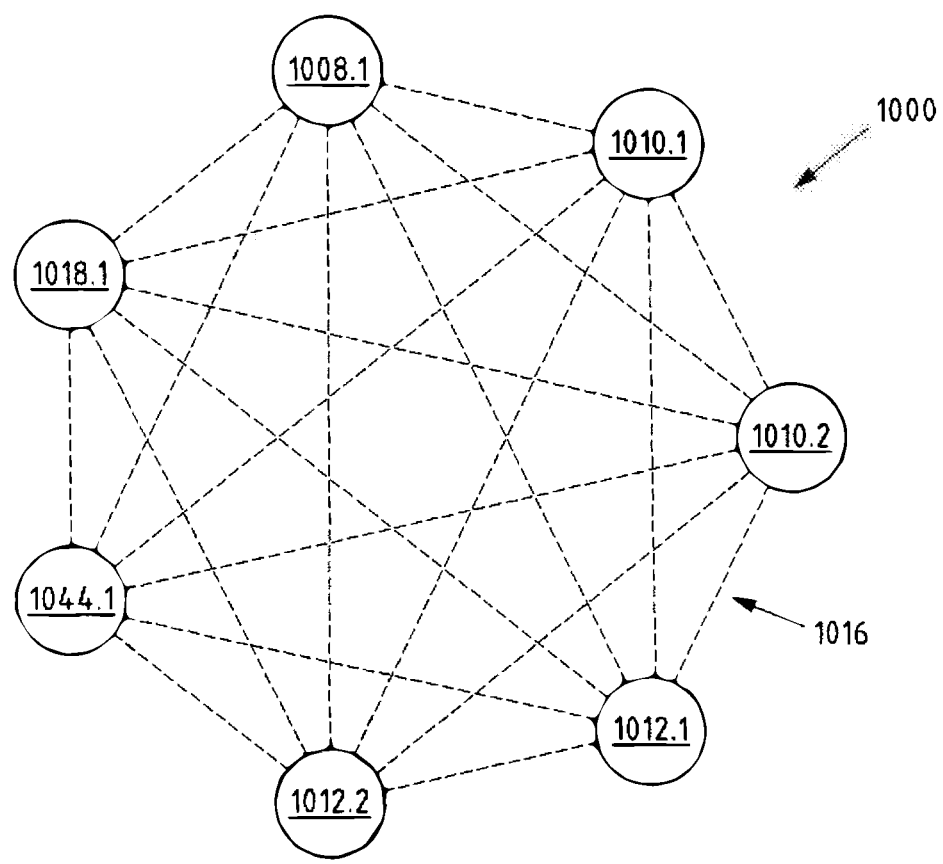
FIG. 10 is a schematic view of a further embodiment of a grid control system according to the present application.

FIG. 10 shows a schematic view of another embodiment of a grid control system 1000 of the application. In the present embodiment, only nodes and participants 1008.1, 1008.2, 1010.1, 1010.2, 1012.1, 1012.2, 1018.1, 1044.1 of the peer-to-peer network 1016 are shown. In the present example, it is assumed that all nodes participants 1008.2, 1010.1, 1010.2, 1012.1, 1012.2, 1018.1, 1044.1 comprise the peer-to-peer application (not shown).

The node 1008.2 may correspond to a non-controllable electrical device and e.g. be formed by a respective peer-to-peer modules of the non-controllable electrical devices. The nodes 1010.1, 1010.2, 1012.1, 1012.2 may correspond to a controllable electrical device and e.g. be formed by a respective peer-to-peer modules of the controllable electrical devices. Node 1044.1 may correspond to a testing device. Node 1018.1 may be another node. It shall be understood that nodes can be full, remote or light nodes.

As can be seen, two different types of peers or node computers 1008.2, 1010.1, 1010.2, 1012.1, 1012.2, 1018.1, 1044.1 are presently illustrated. All peers 1008.2, 1010.1, 1010.2, 1012.1, 1012.2, 1018.1, 1044.1 are comprised by the peer-to-peer network 1016. In the present embodiment, however, only a part of the peers 1008.2, 1010.1, 1010.2, 1012.1, 1012.2, 1018.1, 1044.1 in the present case, the peers (nodes) 1010.1, 1012.1, 1018.1, 1044.1 check the validity of e.g. a controlling process, a control process, an authentication process, a registering process, an analyzing process, a detection process, a testing process and/or further data stored in the peer-to-peer application, such as agreements, instructions data sets, control schemes, switching patterns, and the like.

Nodes (not shown here) can also include SCADA systems, grid control terminals, power-to-gas, power-to-heat, digital grid router/controller, or any other grid assets.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 1010.1, 1012.1, 1018.1, 1044.1, especially particularly powerful peers 1010.1, 1012.1, 1018.1, 1044.1, perform the validation and/or registering algorithms.

Validation, analytics and optimizing can be done on-chain or off-chain, as described hereinbefore. Off-chain validation and/or analyzing can be managed by the peer-to-peer application, like the code on the block chain. Powerful means in particular a high computing power. In other words, in the present case a valid entry in the peer-to-peer application, such as a block chain, is assumed if (only) a part of the peers 1010.1, 1012.1, 1018.1, 1044.1 comes to a positive result. It shall be understood that only a single, especially particularly powerful peer can perform the validation, analytics and/or optimizing process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment, the peer-to-peer application can be formed using multiple block chains. These block chains are connected via frameworks, such as sidechains or smart contracts or interlegder.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A grid control system for at least one electrical grid, comprising:
   at least one peer-to-peer network comprising at least one peer-to-peer application,
   wherein the peer-to-peer application comprises at least one detecting means in form of a code executable by at least two of the nodes of the peer-to-peer network and configured to detect at least one first peer-to-peer module assigned to at least one controllable electrical device upon a connection of the controllable electrical device with the electrical grid, wherein the first peer-to-peer module is configured to communicate with the peer-to-peer application, and wherein the peer-to-peer application comprises at least one registering means in form of code executable by at least two of the nodes of the peer-to-peer network and configured to store at least one identifier assigned to the detected controllable electrical device and at least one switching pattern of the detected controllable electrical device.

2. The system according to claim 1, wherein the peer-to-peer application comprises at least one testing means in form of code executable by at least a part of the nodes of the peer-to-peer network and configured to initiate at least one test operation for determining the actual switching behavior of at least one controllable electrical device, and/or the peer-to-peer application comprises at least one testing means in form of code executable by at least a part of the nodes of the peer-to-peer network and configured to receive at least one test result of at least one conducted test operation for determining the actual switching behavior of at least one controllable electrical device.

3. The system according to claim 2, wherein the testing means is configured to initiate at least one test operation by transmitting at least one test request message comprising at least one test parameter data set to at least one second peer-to-peer module of a testing device and/or to a first peer-to-peer module of a controllable electrical device, wherein the test parameter data set comprises at least one of:
at least one instruction to conduct the test operation,
at least one identifier of the controllable electrical device to be tested, and
at least one test operation setup.

4. The system according to claim 2, wherein the peer-to-peer application comprises at least one storing means in form of code executable by at least a part of the nodes of the peer-to-peer network and configured to store the received test result, wherein storing the received test result comprises at least storing at least one actual switching pattern of the tested controllable electrical device, or wherein storing the received test result comprises adapting an already stored switching pattern in accordance with the received test result.

5. The system according to claim 2, wherein the system comprises at least one testing device configured to conduct at least one test operation by transmitting at least one test request signal to the controllable electrical device and/or by receiving at least one test response signal from the controllable electrical device, and the system comprises at least one second peer-to-peer module assigned to the testing device, wherein the second peer-to-peer module is configured to transmit at least the test result of the conducted test operation to the peer-to-peer application.

6. The system according to claim 5, wherein the system comprises at least one transformer station, wherein the transformer station comprises the testing device.

7. The system according to claim 2, wherein the testing means is configured to initiate at least one common test operation for testing at least two controllable electrical devices simultaneously.

8. The system according to claim 2, wherein the testing means is configured to initiate at least one further test operation of an already tested controllable electrical device upon expiry of at least one preset time period.

9. The system according to claim 1, wherein the system comprises at least one creating means in form of code at least controllable by the peer-to-peer application and configured to create at least one control scheme based on a grid condition and on at least a part of the stored switching patterns of the registered controllable electrical devices, and the peer-to-peer application comprises at least one grid controlling means executable by at least a part of the nodes of the peer-to-peer network and configured to control at least one of the registered controllable electrical devices based on the control scheme.

10. The system according to claim 9, wherein the grid controlling means is configured to control the controllable electrical device by transmitting at least one instruction code data set to at least one registered controllable electrical device, wherein the instruction data set comprises at least one switching rule implementable on the controllable electrical device such that the controllable electrical device works in accordance with the implemented switching rule.

11. The system according to claim 9, wherein the system comprises at least one analyzing means in form of code at least controllable by the peer-to-peer application and configured to analyze a plurality of controllable electrical devices based on at least one of individual switching pattern, individual test result, common test result, historical control action, wherein the creating means is configured to create at least one control scheme based on the result of the analysis.

12. The system according to claim 1, wherein the peer-to-peer application is configured to generate at least one grid control transaction agreement about the controlling of at least one registered controllable electrical device, wherein the grid control transaction agreement comprises at least one of:
grid control transaction criterion,
identifier of the at least one controllable electrical device,
switching pattern.

13. The system according to claim 1, wherein the peer-to-peer application is a decentralized register or a shared database, wherein the peer-to-peer application is configured to store data with given proofs or signatures.

14. The system according to claim 1, wherein the peer-to-peer application is a block chain or decentral ledger.

15. A method for operating at least one electrical grid, the method comprising:

detecting at least one first peer-to-peer module assigned to at least one controllable electrical device upon a connection of the controllable electrical device with the electrical grid by means of at least one detecting means, in form of code, of at least one peer-to-peer application, wherein the detecting means is executed by at least two of the nodes of at least one peer-to-peer network, communicating with the peer-to-peer application, and storing at least one identifier assigned to the detected controllable electrical device and at least one switching pattern of the detected controllable electrical device by means of at least one registering means, in form of code, of the peer-to-peer application, wherein the registering means is executed by at least two of the nodes of at least one peer-to-peer network.

16. A peer-to-peer application, comprising:

at least one detecting means in form of code executable by at least two of the nodes of the peer-to-peer network and configured to detect at least one first peer-to-peer module assigned to at least one controllable electrical device upon a connection of the controllable electrical device with the electrical grid, and at least one registering means in form of code executable by at least two of the nodes of the peer-to-peer network and configured to store at least one identifier assigned to the detected controllable electrical device and at least one switching pattern of the detected controllable electrical device.

17. A first peer-to-peer module assignable to a controllable electrical device, comprising:

at least one connection detecting means configured to detect an establishment of a connection of the controllable electrical device with at least one electrical grid, at least one communicating means configured to provide at least an identifier of the assignable controllable electrical device and at least one control pattern of the assignable controllable electrical device to at least one peer-to-peer application of at least one peer-to-peer network upon a detection of the connection of the assignable controllable electrical device with the electrical grid in order to register the controllable electrical device in the peer-to-peer application by storing at least one identifier assigned to the detected controllable electrical device and at least one switching pattern of the detected controllable electrical device by means of at least one registering means, in form of code, of the peer-to-peer application, wherein the registering means is executed by at least two of the nodes of at least one peer-to-peer network.

18. A testing device, in particular, for a transformer station, comprising:

at least one second peer-to-peer module configured to receive at least one test parameter data set from at least one peer-to-peer application of at least one peer-to-peer network, at least one test conducting means configured to conduct at least one test operation of at least one controllable electrical device, and wherein the second peer-to-peer module is configured to transmit at least the test result to the peer-to-peer application of at least one peer-to-peer network.

* * * * *